US011054063B2

(12) United States Patent
Ratzlaff et al.

(10) Patent No.: US 11,054,063 B2
(45) Date of Patent: Jul. 6, 2021

(54) CLAMPING DEVICE CONFIGURED TO HOLD ONE OR MORE LONGITUDINAL ELEMENTS

(71) Applicants: TE CONNECTIVITY CORPORATION, Berwyn, PA (US); Tyco Electronics UK Ltd, Swindon (GB)

(72) Inventors: Thomas D. Ratzlaff, Menlo Park, CA (US); Paul Craig Tally, Santa Clara, CA (US); Jonathan Mark Eyles, Swindon (GB); Roy MacNaughton, Swindon (GB); Nicholas John Swatko, Bedford, MA (US)

(73) Assignees: TE CONNECTIVITY CORPORATION, Berwyn, PA (US); TYCO ELECTRONICS UK LTD., Swindon (GB)

( * ) Notice: Subject to any disclaimer, the term of this patent is extended or adjusted under 35 U.S.C. 154(b) by 328 days.

(21) Appl. No.: 15/990,267

(22) Filed: May 25, 2018

(65) Prior Publication Data

US 2018/0274699 A1 Sep. 27, 2018

Related U.S. Application Data

(63) Continuation-in-part of application No. 14/950,806, filed on Nov. 24, 2015.

(51) Int. Cl.
*F16L 3/10* (2006.01)
*F16L 3/13* (2006.01)
(Continued)

(52) U.S. Cl.
CPC ........... *F16L 3/1075* (2013.01); *F16L 3/1025* (2013.01); *F16L 3/13* (2013.01); *H02G 3/32* (2013.01); *F16L 3/237* (2013.01)

(58) Field of Classification Search
CPC ............ Y10T 292/20; Y10T 292/1043; Y10T 292/228; Y10T 292/2058; Y10T 292/0863;
(Continued)

(56) References Cited

U.S. PATENT DOCUMENTS 670,251 A * 3/1901 Schiele ................... E05B 75/00
70/16
714,605 A * 11/1902 Potter ...................... F16B 2/065
403/344
(Continued)

FOREIGN PATENT DOCUMENTS

EP 0703394 A1 3/1996
EP 2469673 B1 3/2014

OTHER PUBLICATIONS

Matt Sawyer and Randy Gautreaux; Amphenol Pcd Connecting People and Technology, Catalog; Jun. 2015; 32 Pages.

*Primary Examiner* — Kimberly T Wood

(57) ABSTRACT

Clamping device includes a clamp frame that is configured to move between an open configuration, in which the clamp frame is configured to receive at least one longitudinal element, and a closed configuration, in which the clamp frame wraps around and holds the at least one longitudinal element. The clamp frame includes a coupling end having an inner surface and a coupling base having an outer surface. The inner and outer surfaces have profiles that form a locked engagement to hold the clamp frame in the closed configuration. The clamping device also includes a secondary locking mechanism that secures the coupling end and the coupling base to each other. The secondary locking mechanism is activated after the clamp frame is held in the closed configuration by the locked engagement.

20 Claims, 19 Drawing Sheets

(51) Int. Cl.
*H02G 3/32* (2006.01)
*F16L 3/237* (2006.01)

(58) Field of Classification Search
CPC ............ Y10T 403/595; Y10T 24/1471; E05B 15/0046; E05B 71/00; E05B 73/0041; E05B 75/00; H02G 3/32; F16L 3/1075; F16L 3/1025; F16L 3/13; F16L 3/237
USPC ............... 248/74.1, 74.3, 74.2, 74.4, 74.5; 285/406, 82, 197, 198, 407, 411, 365, 285/420, 87, 91; 403/355, 356, 344, 310
See application file for complete search history.

(56) References Cited

U.S. PATENT DOCUMENTS

| | | | |
|---|---|---|---|
| 1,014,118 A * | 1/1912 | Carberry | E05B 75/00 70/16 |
| 1,083,455 A * | 1/1914 | Mohn | E05B 65/0864 292/57 |
| 1,230,606 A | 6/1917 | Saunders | |
| 1,776,280 A | 9/1930 | Boyd | |
| 1,855,686 A * | 4/1932 | Neal | E05B 75/00 70/16 |
| 1,971,488 A | 8/1934 | Jorgensen | |
| 2,264,581 A * | 12/1941 | Naylor | F16L 17/04 285/365 |
| 2,355,096 A | 8/1944 | Morehouse | |
| 2,744,771 A | 5/1956 | Laurent | |
| 2,969,216 A * | 1/1961 | Hallsey | F16L 3/2336 248/71 |
| 3,011,749 A * | 12/1961 | Kozak | B60P 7/132 410/81 |
| 3,435,823 A | 4/1969 | Edwards | |
| 3,460,788 A | 8/1969 | Goldman | |
| 3,513,508 A * | 5/1970 | Modeme | F16L 3/12 24/16 R |
| 3,552,696 A * | 1/1971 | Orenick | F16L 3/1236 248/74.3 |
| 3,581,349 A | 6/1971 | Verspieren | |
| 3,847,331 A | 11/1974 | Vallinotto et al. | |
| 3,906,592 A | 9/1975 | Sakasegawa et al. | |
| 4,283,816 A * | 8/1981 | Tanaka | F16L 3/137 24/16 PB |
| 4,317,262 A | 3/1982 | Wells, Jr. | |
| 4,382,570 A | 5/1983 | Craig | |
| 4,386,752 A | 6/1983 | Pavlak et al. | |
| 4,415,190 A * | 11/1983 | Finck, Jr. | E05B 65/0089 292/256.6 |
| 4,609,171 A | 9/1986 | Matsui | |
| 4,779,828 A | 10/1988 | Munch | |
| 5,257,439 A | 11/1993 | LeBlanc | |
| 5,344,112 A * | 9/1994 | Peterson | B60H 1/3229 24/279 |
| 5,354,021 A | 10/1994 | Farrell | |
| 5,366,263 A | 11/1994 | Hendrickson | |
| 5,377,510 A * | 1/1995 | Smith | A61B 17/1327 128/878 |
| 5,653,411 A | 8/1997 | Picco et al. | |
| 5,819,374 A * | 10/1998 | Chiles | F16L 3/1236 24/16 PB |
| 6,209,827 B1 | 4/2001 | Kawai | |
| 6,443,403 B1 | 9/2002 | Page et al. | |
| 6,446,474 B1 * | 9/2002 | Tabacchi | B65D 63/1027 128/869 |
| 6,644,618 B1 * | 11/2003 | Balbo | A61M 39/284 251/10 |
| 6,732,982 B1 | 5/2004 | Messinger | |
| 6,817,808 B1 * | 11/2004 | Patinet | F16L 3/1075 166/341 |
| 7,216,862 B2 | 5/2007 | Walsh | |
| 8,075,024 B2 * | 12/2011 | Wern | F16L 25/01 285/373 |
| 8,282,048 B2 * | 10/2012 | Nguyen | F16L 3/1083 248/74.3 |
| 8,328,457 B2 * | 12/2012 | Werth | F16L 23/04 403/289 |
| 8,708,289 B2 | 4/2014 | Allenbach et al. | |
| 8,759,682 B2 | 6/2014 | Devouge | |
| 9,169,952 B2 | 10/2015 | Horgan | |
| 2006/0255598 A1 * | 11/2006 | Berenfield | B65D 45/32 292/256.67 |
| 2009/0091125 A1 * | 4/2009 | Takeda | B25B 27/10 285/88 |
| 2010/0038506 A1 * | 2/2010 | King, Jr. | F16L 3/133 248/230.7 |
| 2013/0160246 A1 | 6/2013 | Hajduch | |
| 2013/0334815 A1 | 12/2013 | Kayacik et al. | |
| 2014/0131528 A1 | 5/2014 | Blakeley et al. | |
| 2016/0003378 A1 | 1/2016 | Frizzell | |

\* cited by examiner

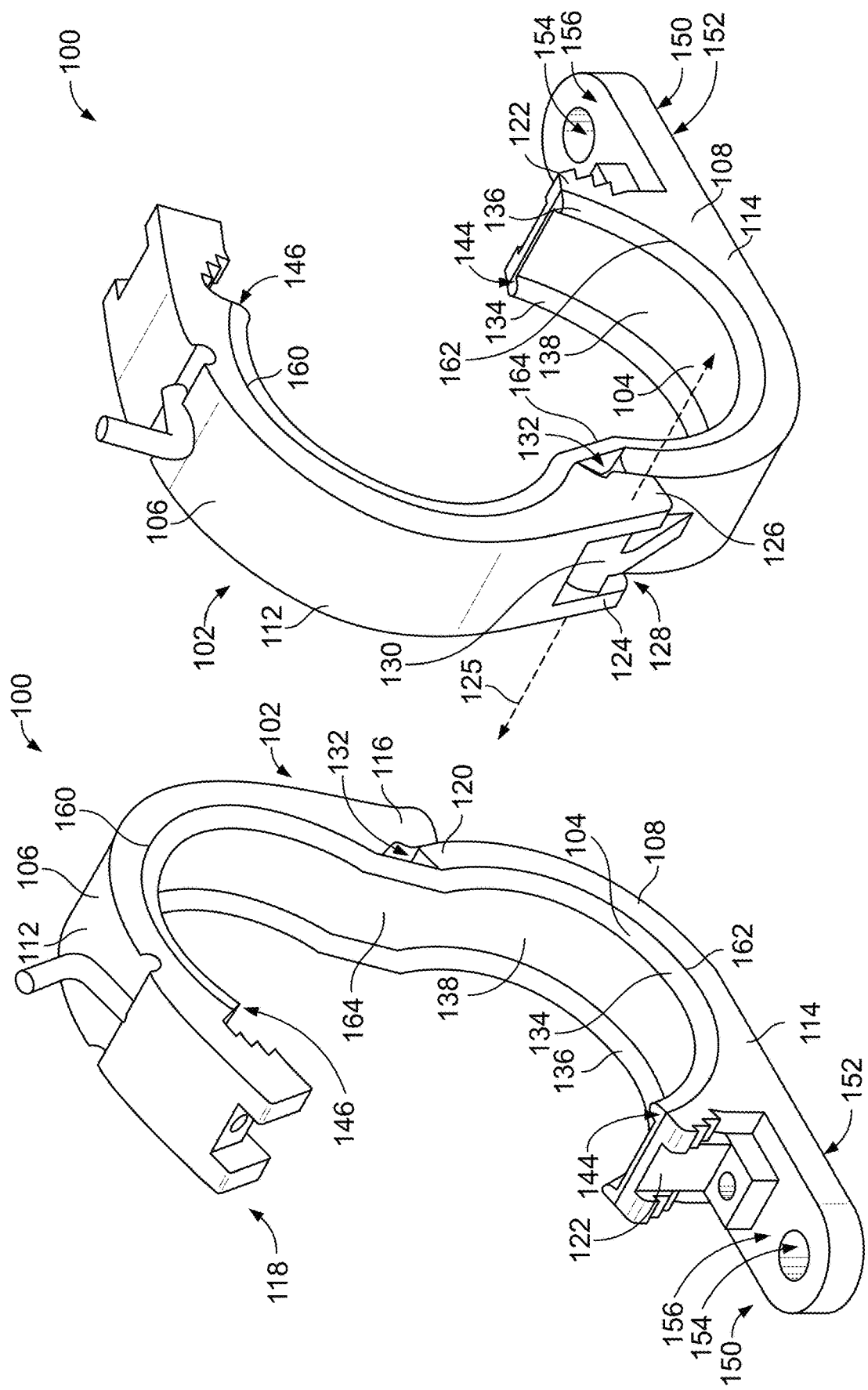

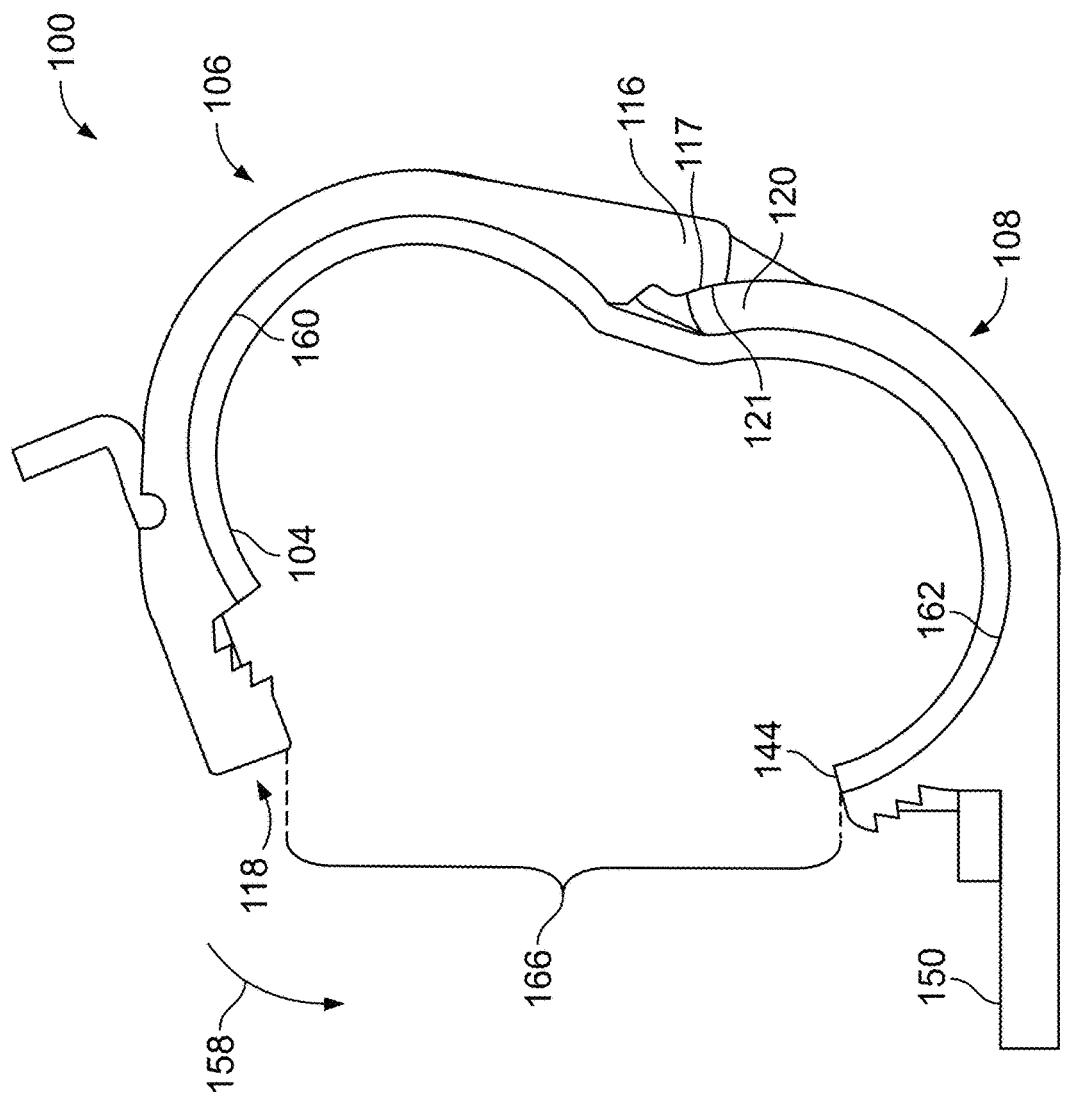
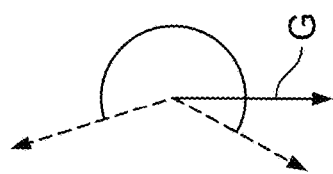
FIG. 3

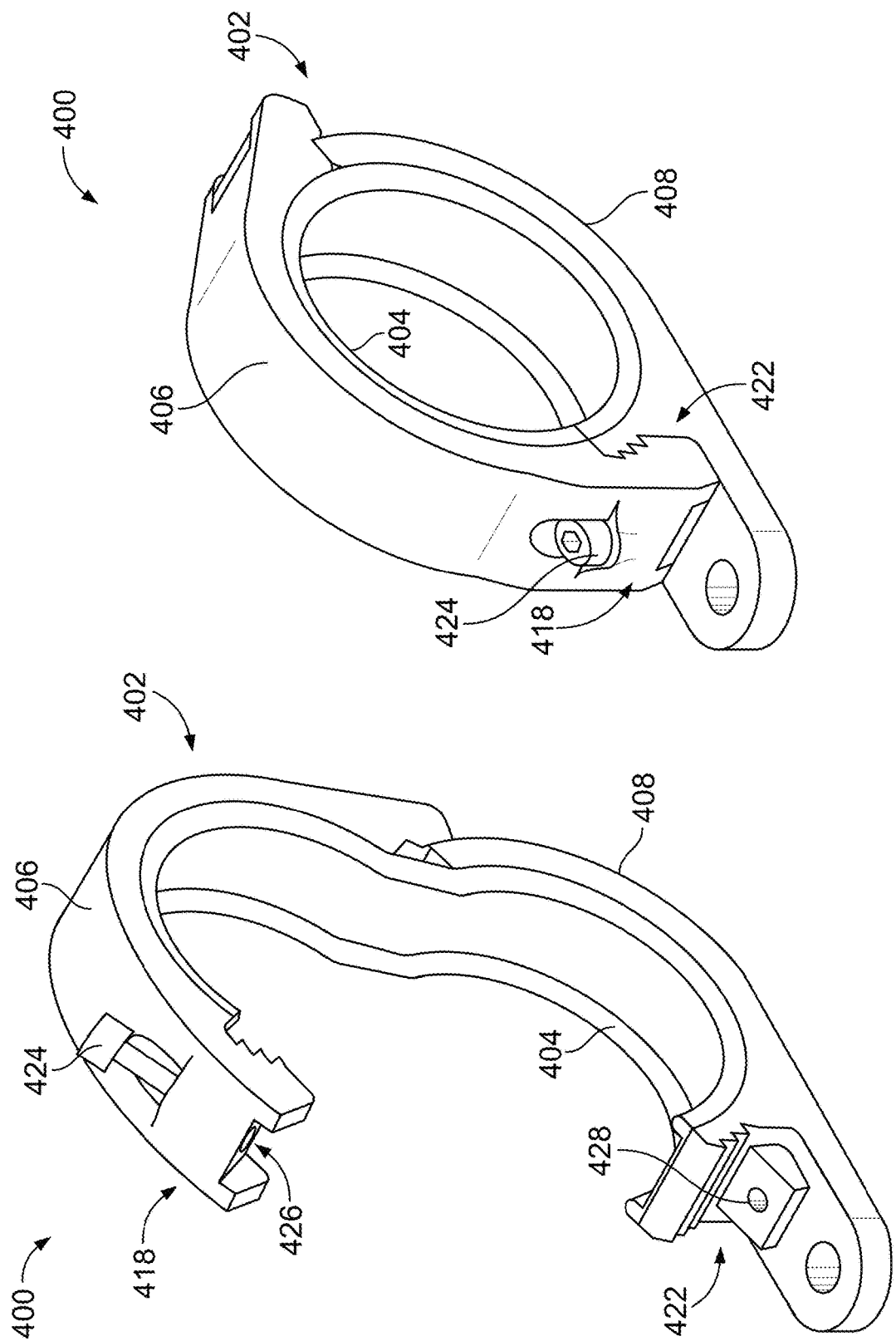

CLAMPING DEVICE CONFIGURED TO HOLD ONE OR MORE LONGITUDINAL ELEMENTS

CROSS-REFERENCE TO RELATED APPLICATION

The present application is a continuation-in-part of U.S. application Ser. No. 14/950,806, filed on Nov. 24, 2015, which is incorporated herein by reference in its entirety.

BACKGROUND

The subject matter relates generally to clamping devices (or clamps) that are configured to hold one or more longitudinal elements, such as wires, cables (e.g., electrical or optical), tubes, or pipes.

It is often desirable to secure at least one longitudinal element to another structure for holding the longitudinal element at a designated position. Alternatively or in addition to this, it may also be desirable to bundle a plurality of longitudinal elements together. The longitudinal elements may be rods, beams, conduits, and the like. Conduits are configured to transmit signals or power or to transfer matter. Conduits may include electrical cables, optical fibers, tubes, pipes, and the like. For instance, large systems (e.g., electrical and mechanical systems of an aircraft) may interconnect different devices through cables. The cables may supply power, supply fluid, or communicate data between the devices. The cables are typically routed along designated paths between the devices to minimize weight and organize cables to optimize the available space. This may be especially true for systems that have numerous cables.

In order to manage the cables and/or route the cables along certain paths between the devices, it may be necessary to hold one or more of the cables with a clamping device, such as a P-clamp. The P-clamp is so-called because it resembles the letter "P" during use. Conventional P-clamps include a metallic band that is wrapped around one or more cables. The P-clamp typically includes a thru-hole at a distal end of the band that aligns with another thru-hole that is near a proximal end of the band. The two thru-holes are configured to receive a screw that is secured to an external structure.

Conventional clamping devices, such as the P-clamp, can be difficult to use in certain situations. For example, it can be challenging for a technician to wrap the clamping device around the cables, align the thru-holes for receiving the screw, and then, while the technician holds the clamp in his or her hand, secure the clamping device to the other structure. This can be especially challenging when the clamping device must be secured to a structure that is difficult to reach. For instance, some spaces within an aircraft (e.g. a wing) may only be accessible using a single hand.

Accordingly, there is a need for an alternative clamping device that may be wrapped around at least one longitudinal element and, if necessary, secured to an external structure.

BRIEF DESCRIPTION

In an embodiment, a clamping device is provided that includes a clamp frame that is configured to move between an open configuration, in which the clamp frame is configured to receive at least one longitudinal element, and a closed configuration, in which the clamp frame wraps around and holds the at least one longitudinal element. The clamp frame includes a coupling end having an inner surface and a coupling base having an outer surface. The inner and outer surfaces have profiles that form a locked engagement to hold the clamp frame in the closed configuration. The clamping device also includes a secondary locking mechanism that secures the coupling end and the coupling base to each other. The secondary locking mechanism is activated after the clamp frame is held in the closed configuration by the locked engagement.

In one aspect, the clamp frame has a passage through the coupling end and the coupling base has a base cavity that aligns with the passage when the clamp frame is in the closed configuration. The secondary locking mechanism includes a locking pin having a handle and a pin segment extending through the passage and into the base cavity. The pin segment is rotatable about a pin axis and has a distal lobe that projects radially away from the pin axis. The base cavity is defined by a base surface of the coupling base, wherein the distal lobe is operable to engage the base surface and, as the pin segment is rotated about the pin axis to an unlocking position, dislodge the coupling end from the coupling base.

In one aspect, the coupling end includes at least one grip element having the inner surface and the coupling base includes at least one mating element having the outer surface. The grip element and the mating element of the coupling end and the coupling base, respectively, engage each other to hold the clamping device in a closed configuration. In some aspects, the grip element and mating element may enable a partially-closed configuration that facilitates positioning longitudinal elements within a passage of the clamping device.

In another aspect, the secondary locking mechanism includes a fastener that is inserted through respective passages of the coupling end and the coupling base. The fastener may be a threadless pin or a threaded pin.

In an embodiment, a clamping device is provided that includes a first clamp section having a joint end and a coupling end. The clamping device also includes a second clamp section having a joint end and a coupling base. The joint ends of the first and second clamp sections are movably coupled to each other such that the first and second clamp sections are movable between an open configuration and a closed configuration. The coupling end of the first clamp section and the coupling base of the second clamp section engage each other in the closed configuration to form a clamp frame for holding at least one longitudinal element. The first and second clamp sections form a gap therebetween proximate to the joint ends. The clamping device also includes an inner layer that is coupled to and extends along the first and second clamp sections. The inner layer is configured to engage the at least one longitudinal element. The inner layer extends over the gap.

In one or more embodiments, a clamping device is provided that includes a clamp frame that is operable to move between an open configuration and a closed configuration. The clamp frame configured to wrap around and hold at least one longitudinal element in the closed configuration within a working passage defined by the clamp frame. The clamp frame includes a coupling end and a coupling base that engage each other in the closed configuration. The clamping device also includes a locking pin having a pin segment that couples to the coupling end and engages the coupling base at a pin-base interface when in the closed configuration. The coupling end has a grip element and the coupling base has a mating element. The grip element and the mating element are configured to engage each other at an end-base interface. The coupling end configured to rotate about the pin-base interface when a lateral force is applied to the coupling end, thereby driving the grip element into the mating element in a direction that is at least partially transverse to a direction of the lateral force.

In one or more embodiments, a clamping device is provided that includes a clamp frame that is operable to move between an open configuration, in which the clamp frame is configured to receive at least one longitudinal element, and a closed configuration, in which the clamp frame wraps around and holds the at least one longitudinal element. The clamp frame includes a coupling end having a base surface and a coupling base having an outer surface. The inner and outer surfaces have profiles that form a locked engagement to hold the clamp frame in the closed configuration. The clamping device also includes a secondary locking mechanism that secures the coupling end and the coupling base to each other. The secondary locking mechanism is activatable after the clamp frame is held in the closed configuration by the locked engagement. The clamp frame has a passage through the coupling end and the coupling base has a base cavity that aligns with the passage when the clamp frame is in the closed configuration. The secondary locking mechanism includes a locking pin having a handle and a pin segment extending through the passage and into the base cavity. The pin segment is rotatable about a pin axis and has a distal lobe that projects radially away from the pin axis. The distal lobe is configured to engage the coupling base as the locking pin is rotated to a locked position, thereby pressing the coupling end toward the coupling base. The distal lobe is configured to engage the coupling base as the locking pin is rotated to an unlocking position and drives the coupling end away from the coupling base, thereby dislodging the coupling end from the coupling base. The distal lobe is permitted to exit the base cavity when the locking pin is in a neutral position. The clamp frame includes an exterior surface that is shaped to hold the handle when the locking pin is in the neutral position.

BRIEF DESCRIPTION OF THE DRAWINGS

FIG. 1 is a perspective view of a clamping device formed in accordance with an embodiment when the clamping device is in an open configuration.

FIG. 2 is another perspective view of the clamping device of FIG. 2 when the clamping device is in the open configuration.

FIG. 3 is a side view of the clamping device of FIG. 2 when the clamping device is in the open configuration.

FIG. 11 is a perspective view of a clamping device formed in accordance with an embodiment when the clamping device is in an open configuration with an alternative threaded secondary locking mechanism.

FIG. 12 is another perspective view of the clamping device of FIG. 11 when the clamping device is in the closed configuration.

DETAILED DESCRIPTION

Figure 5:
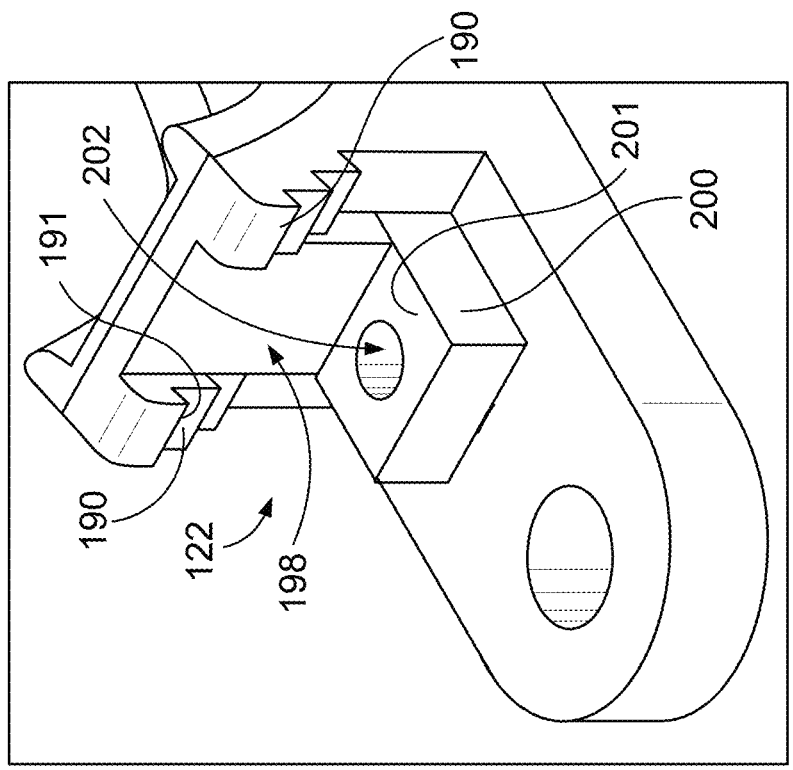
FIG. 5 is an enlarged view of the clamping device of FIG. 2 illustrating a coupling base in greater detail.

Embodiments set forth herein include clamping devices that are configured to secure one or more longitudinal segments with respect to each other and, optionally, with respect to an external structure. For example, the clamping device may be used as a wire organizer that bundles the wires and, optionally, may be secured to an external structure to position the bundle of wires at a designated position. Embodiments may reduce installation time and/or provide a simpler process for securing the longitudinal element(s). In particular embodiments, the clamping device may be implemented without using separate tools. In particular embodiments, the clamping device may provide a pinch-less hinge.

FIGS. 1 and 2 are different perspective views of a clamping device 100 formed in accordance with an embodiment. The clamping device 100 is configured to hold one or more longitudinal elements (not shown) and, optionally, be secured to an external structure. The clamping device 100 includes a clamp frame 102 and an optional inner layer 104 that is coupled to the clamp frame 102. In the illustrated embodiment, the clamp frame 102 includes a first clamp section 106 and a second clamp section 108. The first and second clamp sections 106, 108 are discrete structures that are configured to be coupled to one another to form the clamp frame 102. In FIGS. 1 and 2, the clamp frame 102 is in an open configuration such that the first and second clamp sections 106, 108 are spaced apart from each other and configured to receive the longitudinal element(s). The clamp frame 102 is also configured to be in a closed configuration (shown in FIG. 4) in which the clamp frame 102 wraps around and holds the longitudinal elements.

In other embodiments, however, the clamp frame 102 may include a continuous belt or collar that is configured to be wrapped around the longitudinal elements. For example, the first and second clamp sections 106, 108 may be formed from a continuous strip or band of a flexible element, such as a plastic or metal. The continuous strip or band may be other materials or may include other materials, such as a hook and loop fabric. In such an embodiment, the clamp frame 102 may move between the open configuration and the closed configuration and be secured to itself as described herein.

In some embodiments, the first clamp section 106 includes a section body 112, and the second clamp section 108 includes a section body 114. The section bodies 112, 114 may include a rigid or semirigid material, such as plastic (e.g., polyether ether ketone (PEEK)) or metal (e.g., aluminum or alloy thereof). In some embodiments, the section bodies 112, 114 are molded to include the features described herein. Alternatively or in addition to being molded, the section bodies 112, 114 may be bent, etched, or otherwise shaped to include the features described herein. In the illustrated embodiment, the section bodies 112, 114 are continuous or integrated structures that the section bodies 112, 114 include only a single material. The single material may be different from the material of the inner layer 104. In other embodiments, however, the section bodies 112, 114 may include discrete components that are coupled to each other to form the section bodies.

Figure 13:
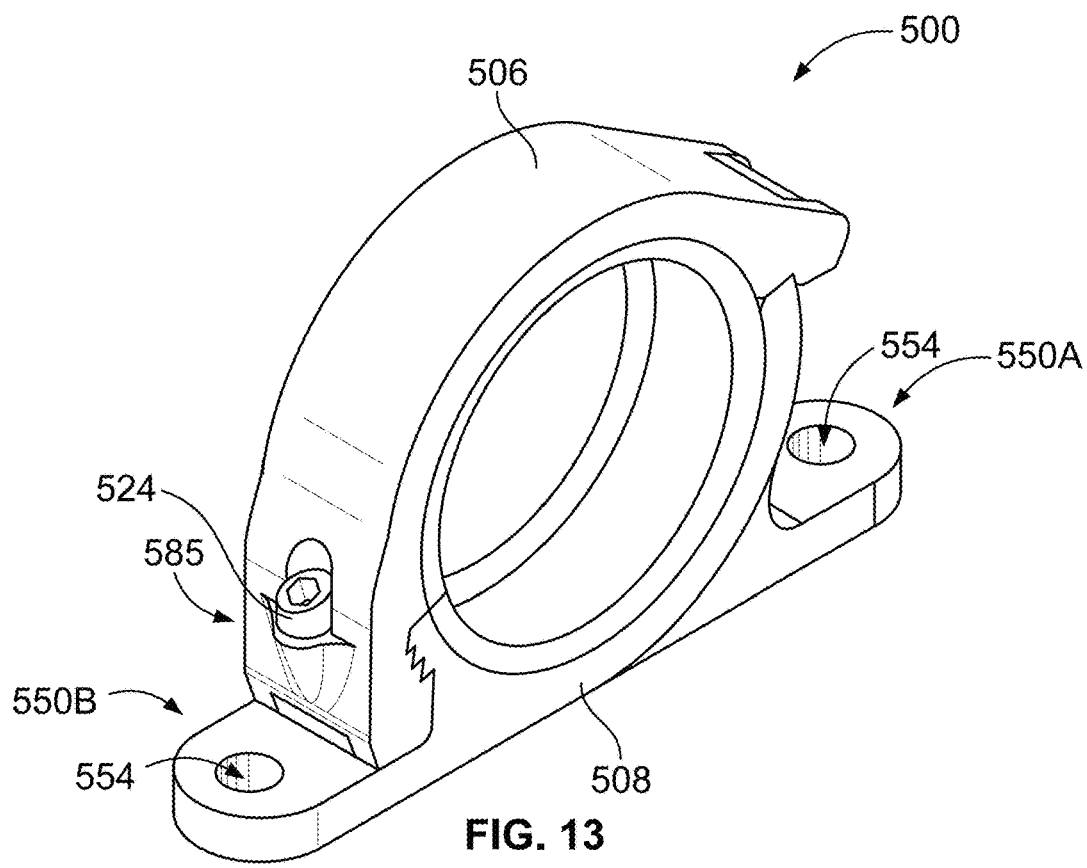
FIG. 13 illustrates a clamping device having two mounting flanges in accordance with an embodiment and a secondary locking mechanism.

The first clamp section 106 has a joint end 116 and a coupling end 118. The first clamp section 106 extends lengthwise between the joint end 116 and the coupling end 118. The second clamp section 108 includes a joint end 120 and a coupling base 122. Optionally, the second clamp section 108 includes a mounting flange or element 150 that is coupled to the section body 114. The mounting flange 150 has an outer surface 152 that is configured to be positioned adjacent to an external structure (not shown). The mounting flange 150 also includes a thru-hole 154 that is configured to receive hardware (not shown), such as a pin or plug, for securing the clamping device 100 to the external structure. The mounting flange 150 has an inner surface 156 that is opposite the outer surface 152. Optionally, the mounting flange 150 may be stacked with respect to another mounting flange (not shown) and each mounting flange may receive a portion of the hardware. Optionally, the clamp frame 102 may include more than one mounting flange. Such an embodiment is shown in FIG. 13.

The joint ends 116 and 120 are configured to be movably coupled to each other such that the first and second clamp sections 106, 108 may move relative to each other between the open configuration and the closed configuration. As shown in FIG. 2, the joint ends 116, 120 are rotatably coupled about an axis of rotation 125. For example, the joint end 116 includes first and second projections 124, 126 that define a working gap 128 therebetween. The joint end 120 includes a hinge element 130 that is received within the working gap 128. Although not shown, the hinge element 130 may include a passage (or two passages) that receive pivot elements (e.g., posts) from the first and second projections 124, 126. The passage(s) and the pivot elements may align with each other along the axis of rotation 125 and enable the first and second clamp sections 106, 108 to rotate about the axis of rotation 125.

However, it should be understood that the first and second clamp sections 106, 108 may be movably coupled in other manners. For example, the clamp frame 102 may include a floatable hinge having two axes of rotation. The first clamp section 106 may be secured to the floatable hinge and be rotatable about one axis of rotation, and the second clamp section 108 may be secured to the floatable hinge and rotatable about the other axis of rotation. Other methods of movably coupling the first and second clamp sections 106, 108 are contemplated.

Figure 6:
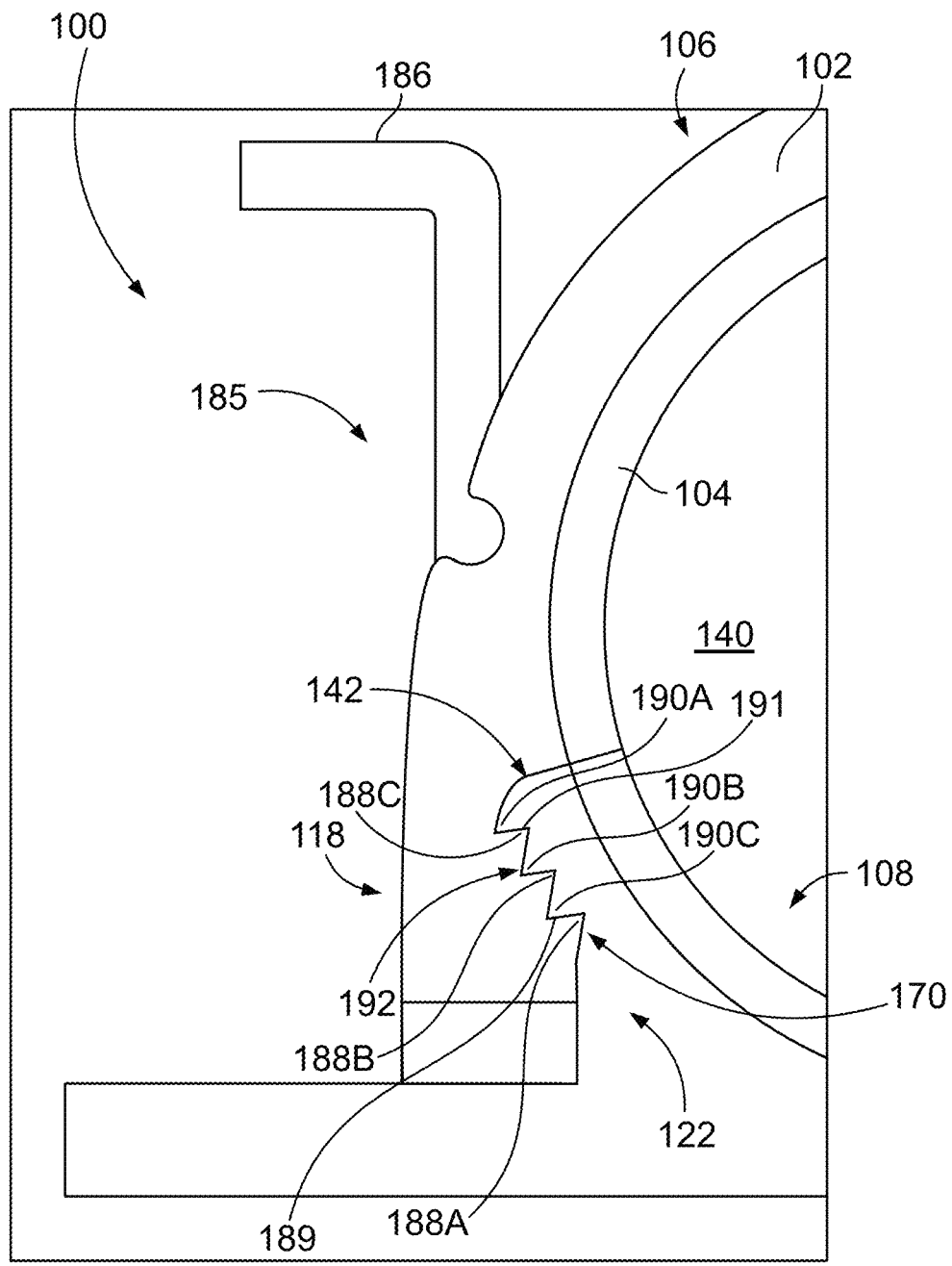
FIG. 6 is an enlarged side view of the clamping device of FIG. 2 when the clamping device is in the closed configuration.

As shown in FIGS. 1 and 2, the first and second clamp sections 106, 108 (or respective section bodies 112, 114) may form a pinching gap 132 proximate to the joint ends 116, 120, respectively. For example, the pinching gap 132 may be defined between portions of the joint ends 116, 120. When the first and second clamp sections 106, 108 are in the closed configuration, as shown in FIG. 6, the first and second clamp sections 106, 108 may form a seam 142. For certain embodiments, the inner layer 104 is configured to extend over or across the pinching gap 132 at a bridge portion 164 of the inner layer 104 to prevent, for example, longitudinal elements being inadvertently positioned within the pinching gap 132. The inner layer 104 may comprise a flexible or stretchable material. More specifically, the inner layer 104 is configured to be in a relaxed state when the clamp frame is in the closed configuration and a stretched or tensed state when the inner layer 104 is in the open configuration. In the stretched state, the inner layer 104 may provide a retracting force that facilitates closing the clamp frame 102.

The inner layer 104 may comprise an elastic or stretchable material that permits the clamp frame 102 to move between the open and closed configurations. For example, the inner layer 104 may comprise a compliant or elastomeric material. The inner layer 104 may be referred to as a compliant layer in some embodiments. The inner layer 104 may contain an elastomer or synthetic rubber. For example, the inner layer may contain at least one of silicone, chloroprene, ethylene propylene terpolymer (e.g., ethylene propylene diene monomer (EPDM)), ethylene propylene copolymer (sometimes referred to as ethylene propylene rubber or EPR), nitrile, or fluorosilicone. In some embodiments, the inner layer 104 may comprise a mesh or woven material. The inner layer may include or consist essentially of a metal material (e.g., metal mesh). For example, at least some applications of the clamping device 100 may include embodiments that experience high temperatures or may be used to ground the longitudinal elements. The inner layer may be injection-molded. In this example, metal particles may or may not be dispersed within the injected material. Metallic inner layers may also be formed in other manners (e.g., casting).

The inner layer 104 may be secured to base surfaces 160, 162 of the section bodies 112, 114, respectively. For example, an adhesive may be applied to interfaces defined between the base surfaces 160, 162 and the inner layer 104. Alternatively or in addition to the adhesive, the inner layer 104 may include projections that are inserted into corresponding cavities of the section bodies 112, 114 and form an interference fit therewith.

In the illustrated embodiment, the inner layer 104 forms first and second longitudinal ridges 134, 136 that are spaced apart from each other and joined by a recessed area 138. The first and second longitudinal ridges 134, 136 are configured to engage or grip the longitudinal element(s) when the clamp frame 102 is in the closed configuration. To this end, the inner layer 104 may be compressible or compliant to provide tolerance in gripping the longitudinal element(s). Each of the first and second longitudinal ridges 134, 136 and the recessed area 138 extend over or across the pinching gap 132 at the bridge portion 164 of the inner layer 104.

When the clamp frame 102 is in the closed configuration, the inner layer 104 may define a working passage 140 (shown in FIG. 6) through which the longitudinal element(s) extend. In some embodiments, the inner layer 104 essentially defines the entire passage 140, except for a seam 142 (shown in FIG. 6) at an interface between the first and second clamp sections 106, 108. In other embodiments, however, the inner layer 104 defines less than an entirety of the passage 140. In particular embodiments, the inner layer 104 forms a gap-less engaging surface 141 (FIG. 7) that prevents pinching of the longitudinal element(s). For example, the inner layer 104 may extend continuously (e.g., without gaps in the inner layer 104) from one layer end 144 to an opposite layer end 146.

FIG. 3 is a side view of the clamping device 100 in the open configuration. The joint ends 116, 120 have respective blocking surfaces 117, 121. The blocking surfaces 117, 121 are shaped relative to each other to form an angle limit stop. More specifically, the blocking surfaces 117, 121 may prevent or block the first clamp section 106 from rotating further away from the second clamp section 108. For example, the first clamp section 106 is blocked from rotating further in the clockwise direction with respect to the view shown in FIG. 3. Optionally, the blocking surfaces 117, 121 may be shaped to initially resist movement of the first clamp section 106 to the closed configuration. For example, the blocking surfaces 117, 121 may be shaped relative to each other such that a threshold force 158 must be applied in the counter-clockwise direction (with respect to FIG. 3) to move the first clamp section 106 to the closed configuration. In FIG. 3, each of the blocking surfaces 117, 121 is essentially planar. However, it is contemplated that the blocking surfaces 117, 121 may have other shapes.

In the open configuration, the coupling end 118 and the layer end 144 are separated by a receiving gap 166. The receiving gap 166 is sized larger than a diameter of the passage 140 (FIG. 6) to permit the longitudinal element(s) being positioned therein. Each of the base surfaces 160, 162 of the first and second clamp sections 106, 108, respectively, may have a curved shape and the inner layer 104 may conform to the curved shape.

During installation of the longitudinal element(s), at least one of the first clamp section 106 or the second clamp section 108 may receive the longitudinal element(s). The first clamp section 106 or the second clamp section 108 may function as a temporary support that holds the longitudinal element(s) prior to the clamping device 100 being fully closed. For example, when the first and second clamp sections 106, 108 are in the open configuration, the clamping device 100 may permit positioning one or more of the longitudinal elements within the spaces defined by the first clamp section 106 or the second clamp section 108. After the longitudinal element(s) are positioned, the clamping device 100 allows the user to release the already positioned longitudinal element(s) (and the clamping device 100) and retrieve additional longitudinal elements. While the user retrieves other longitudinal elements, the first clamp section 106 and/or the second clamp section may hold the longitudinal element(s) that have already been positioned. Such embodiments may be suitable for applications in which the clamping device 100 is difficult to reach. For example, a user may be able to use a single hand for positioning the longitudinal elements, which may require multiple steps, and closing the clamping device 100. In some cases, as described below, the clamping device 100 may be only partially closed while the user is retrieving the other longitudinal elements.

Due to the shape of the first and second clamp sections 106, 108, the clamping device 100 may have a range of orientations relative to gravity G in which the clamping device 100 may momentarily hold the longitudinal element(s) prior to closing. In FIG. 3, the solid arrow represents the direction of gravity. However, the clamping device 100 may have a range of orientations relative to gravity as illustrated by the dashed arrows. In such embodiments, the mounting flange 150 is secured to the external structure prior to closing the clamping device 100.

When the first and second clamp sections 106, 108 are in the closed configuration (FIG. 6), the inner layer 104 (or the combined base surfaces 160, 162) has a substantially circular profile. In the illustrated embodiment, each of the first and second clamp sections 106, 108 may provide about half (or about 180°) of the circular shape.

Figure 4:
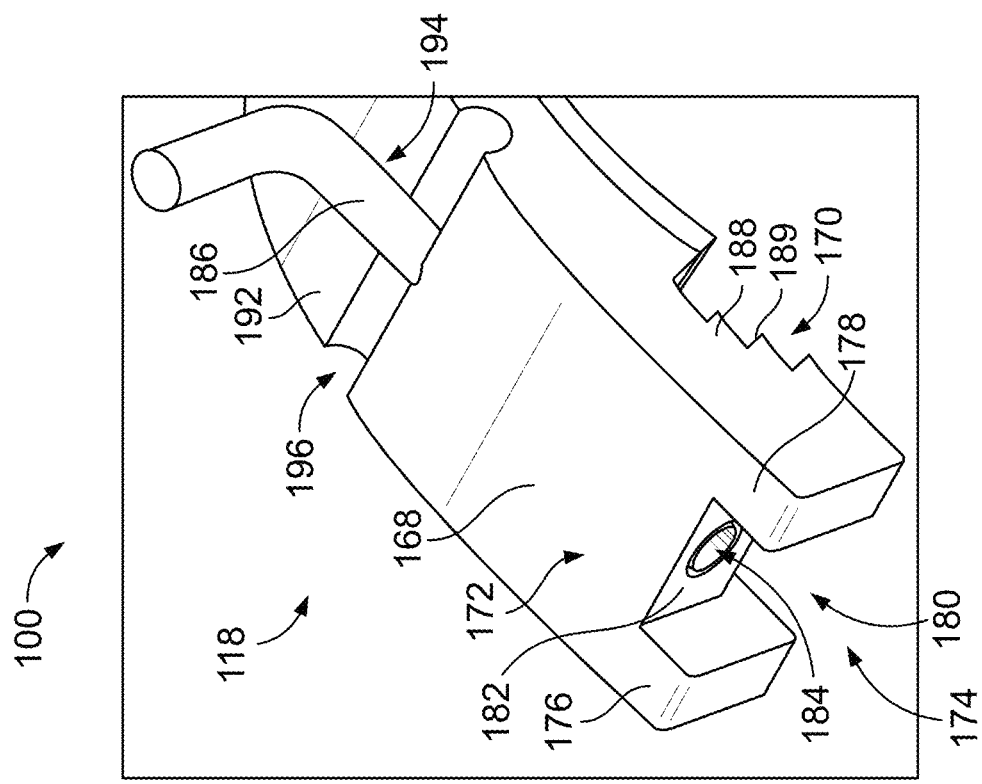
FIG. 4 is an enlarged view of the clamping device of FIG. 2 illustrating a coupling end in greater detail.

FIGS. 4 and 5 illustrate enlarged views of the coupling end 118 and the coupling base 122, respectively. The coupling end 118 is configured to attach to the coupling base 122 such that the first and second clamp sections 106, 108 (FIG. 1) are secured to each other and the clamping device 100 maintains the closed configuration. For example, as shown in FIG. 4, the coupling end 118 may include a latch element 168 having an inner surface 170 and an outer surface 172 that face in generally opposite directions. The latch element 168 also includes a mating face or side 174 that extends between the inner and outer surfaces 170, 172.

The mating face 174 and the inner surface 170 are configured to directly interface with the second clamp section 108 (FIG. 1). The mating face 174 is defined in part by first and second tabs 176, 178 that are separated by a section space 180. An end surface 182 of the latch element 168 extends between the first and second tabs 176, 178. The first and second tabs 176, 178 project away from the end surface 182.

Optionally, the latch element 168 includes locking passage 184 having an opening at the end surface 182. In such embodiments, the clamping device 100 may include a fastener 186 that is inserted into the locking passage 184. As described herein, the fastener 186 may facilitate securing the coupling end 118 and the coupling base 122 (FIG. 1) to each other while the clamping device 100 is in use. In the embodiments illustrated herein, the fasteners are movable pins that include a threadless post or threaded post (e.g., screw). It should be understood, however, that a variety of fasteners may be used. For example, alternative fasteners may include latches, clips, clasps, elastomeric member (e.g., rubber band). It should be understood that the above examples are not necessarily mutually exclusive. For example, a latch may be a clasp in some instances.

The inner surface 170 of the latch element 168 may be shaped to attach to the coupling base 122 and prevent inadvertent removal of the first clamp section 106 away from the second clamp section 108. The inner and outer surfaces 170, 172 have profiles that form a locked engagement to hold the clamp frame 102 in the closed configuration. To this end, the clamping device 100 may include grip elements and mating elements. For example, the latch element 168 includes a series of grip elements 188 that define notches for receiving mating elements 190 (shown in FIG. 5) of the coupling base 122. The grip elements 188 and the mating elements 190 are similarly shaped in FIGS. 4 and 5 and may be similar to teeth. The grip elements 188 and the mating elements 190 include grip and mating surfaces 189, 191, respectively. The grip and mating surfaces 189, 191 are shaped such that when a grip surface 189 and a mating surface 191 engage each other, the grip and mating surfaces 189, 191 prevent the first clamp section 106 from being inadvertently removed. In an exemplary embodiment, the latch element 168 includes two series of grip elements 188 in which a first series of grip elements 188 is substantially aligned with the first tab 176 and the second series of grip elements 188 is substantially aligned with the second tab 178. However, in alternative embodiments, the clamping device 100 may include only a single grip element and a single mating element.

The fastener 186 is configured to slide through the passage 184. As shown, the first clamp section 106 has an outer surface 192 that is shaped to permit the fastener 186 to slide therealong. More specifically, the outer surface 192 defines a recess 194 that permits the fastener 186 to slide in axial direction such that an end of the fastener may slide into and out of the section space 180. Also shown, the outer surface 192 is shaped to include a locking channel 196. As described below, the locking channel 196 is configured to receive a portion of the fastener 186.

Turning to FIG. 5, the coupling base 122 is also shaped to attach to the coupling end 118 (FIG. 4). The coupling base 122 has an outer surface 198 that faces generally away from the passage 140 (FIG. 6). The coupling base 122 also includes a stage or platform 200. The stage 200 has a stage surface 201 that includes an opening to a passage 202. The stage 200 is configured to be received within the section space 180 (FIG. 4) when the clamping device 100 is in the closed configuration. In the closed configuration, the passage 202 is aligned with the passage 184 (FIG. 4). As shown, the coupling base 122 includes two series of the mating elements 190.

FIG. 6 is an enlarged side view of the clamping device 100 in the closed configuration. The fastener 186 is an unlocking position relative to the second clamp section 108 in FIG. 6. As shown, the first and second clamp sections 106, 108 are coupled to each other to form the passage 140. The coupling end 118 and the coupling base 122 engage each other along a seam 142. In particular embodiments, the seam 142 may represent the only discontinuity that extends entirely through the inner layer 104 and is positioned adjacent to the passage 140. During a closing operation, the first tab 176 or the second tab 178 may engage the stage 200. If the first clamp section 106 is misaligned, the first tab 176 or the second tab 178 may be deflected by the stage 200 to self-align the first clamp section 106 relative to the second clamp section 108.

In particular embodiments, the coupling end 118 and the coupling base 122 provide a primary locking mechanism that is followed by a secondary locking mechanism 185 that includes the fastener 186. Alternatively, the clamping device 100 may include only one locking mechanism, such as the primary locking mechanism or the second locking mechanism described herein. The inner and outer surfaces 170, 172 have profiles that form a locked engagement to hold the clamp frame 102 in the closed configuration.

For embodiments that include the grip and mating elements 188, 190, the grip elements 188 of the coupling end 118 and the mating elements 190 of the coupling base 122 may provide a ratcheted engagement. More specifically, the grip elements 188 include grip elements 188A, 188B, 188C, and the mating elements 190 include mating elements 190A, 190B, 190C. During a closing operation in which the coupling end 118 and the coupling base 122 are moved relatively toward each other, the grip surface 189 of the grip element 188A may initially engage the mating surface 191 of the mating element 190A. The grip surface 189 is a portion of the inner surface 170, and the mating surface 191 is a portion of the outer surface 172. The grip and mating elements 188A and 190A may engage each other and provide a tactile indication that the clamp frame 102 is partially closed. When the grip and mating elements 188A and 190A are engaged, the likelihood that the first clamp section 106 may inadvertently rotate away from the second clamp section 108 is reduced. This may be particularly useful for applications in which the longitudinal elements are compressed by the inner layer 104. In such cases, the longitudinal elements may provide an outward force that pushes the first clamp section 106 away from the closed configuration. During the closing operation, the grip element 188A may continue to slide along the outer surface 192 and engage each of the subsequent mating elements 190B, 190C. Likewise, the mating element 190A may continue to slide along the inner surface 170 and engage each of the subsequent grip elements 188B, 188C. As such, the first and second clamp sections 106, 108 may form a ratcheted engagement.

Figure 7:
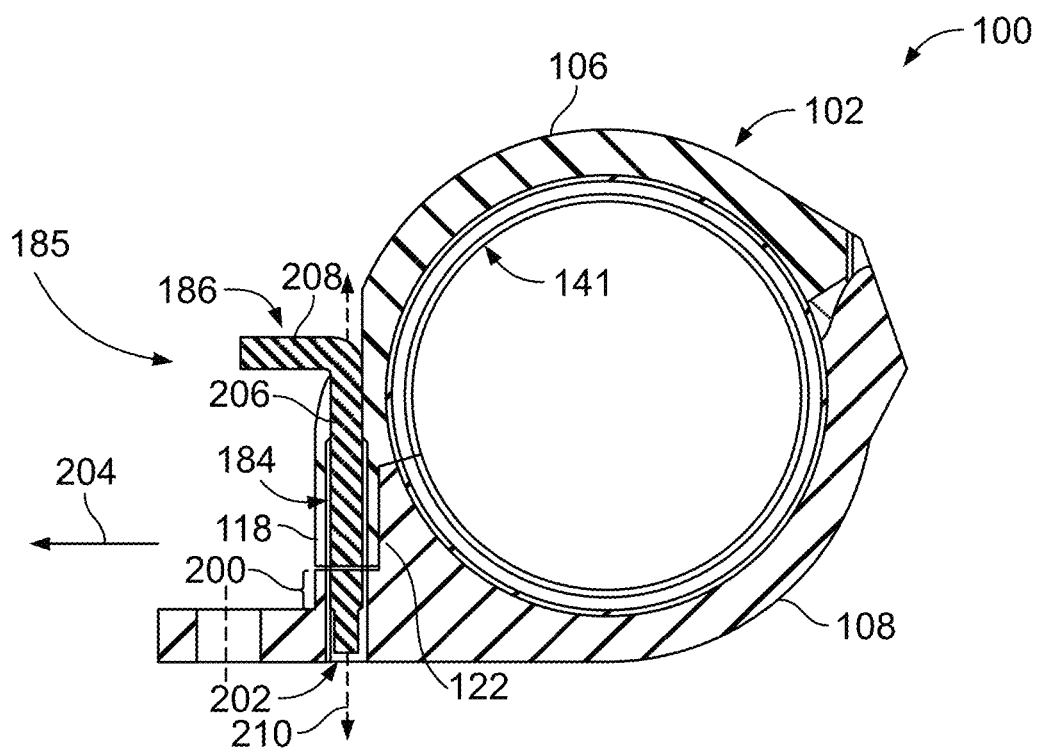
FIG. 7 illustrates a side cross-section of the clamping device of FIG. 2 when the clamping device is in the closed configuration and a secondary locking mechanism is engaged but not in a locked position.

FIG. 7 illustrates a side cross-section of the clamping device 100 in the closed configuration. In some embodiments, the secondary locking mechanism 185 includes the fastener 186, the passages 184, 202, and the locking channel 196. The secondary locking mechanism 185 secures the coupling end 118 and the coupling base 122 to each other. The fastener 186 includes a locking segment 206 and an operator-engaging segment or handle 208 that is coupled to the locking segment 206. The locking segment 206 is disposed within the passage 184 of the coupling end 118 and is configured to be inserted into the passage 202 of the coupling base 122. The operator-engaging segment 208 is accessible to an individual (e.g., technician) when the clamp frame 102 is in the closed configuration. As shown, the fastener 186 has a non-linear structure. The locking segment 206 and the operator-engaging segment 208 extend in perpendicular directions.

The fastener 186 is configured to be moved in an insertion direction and an opposite withdrawal direction along a pin axis 210. The fastener 186 is rotatable about the pin axis 210. Compared to FIG. 6, the fastener 186 has been advanced through the passage 184 of the coupling end 118 and into the passage 202 of the coupling base 122, but has not been rotated yet. The stage 200 provides an increased thickness to further reduce the likelihood that the fastener 186 would be inadvertently removed from the passage 202. When the first and second clamp sections 106, 108 are engaged as shown in FIG. 7, the profiles of the inner surface 170 (FIG. 4) and the outer surface 198 (FIG. 5) prevent the first clamp section 106 from inadvertently moving away from the second clamp section 108. However, the profiles of the inner and outer surfaces 170, 198 permit moving the first clamp section 106 if, for example, a lateral outward force 204 is applied to the coupling end 118. When the fastener 186 is inserted into the passage 202, the fastener 186 prevents the coupling end 118 from moving away from the coupling base 122. The fastener 186 is activatable after the clamp frame 102 is held in the closed configuration by the locked engagement between the inner and outer surfaces 170, 198. In some embodiments, the fastener 186 is captive such that the fastener 186 may not be removed. In other embodiments, the fastener 186 may be removable.

Figure 8:
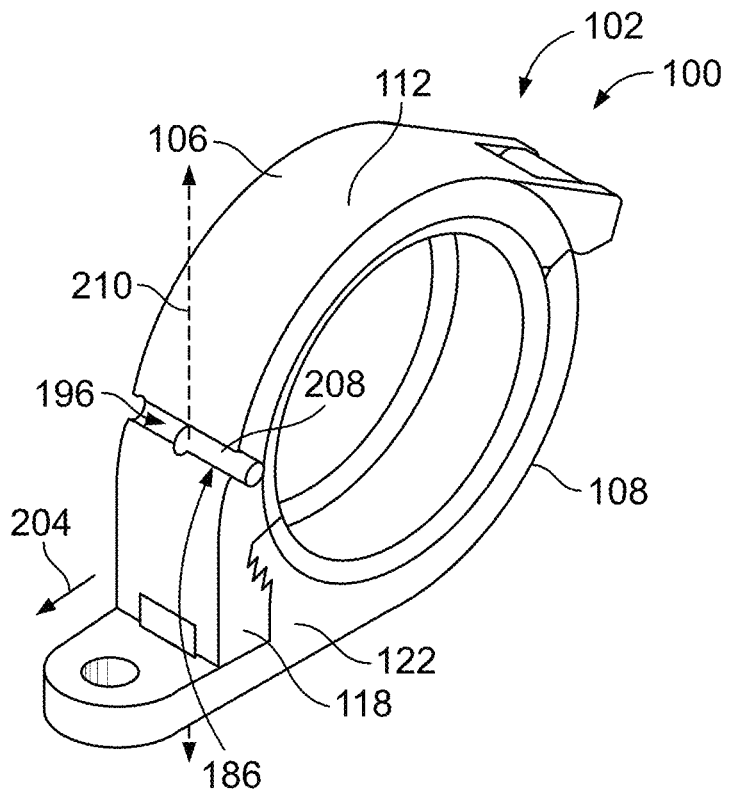
FIG. 8 illustrates a perspective view of the clamping device of FIG. 2 when the clamping device is in the closed configuration and a secondary locking mechanism has been engaged and moved into the locked position.

FIG. 8 illustrates a perspective view of the clamping device 100 when the clamping device 100 is in the closed configuration and the fastener 186 is in a locked orientation. Compared to FIG. 7, the fastener 186 has been rotated about the pin axis 210. As the fastener 186 is rotated, the operator-engaging segment 208 of the fastener 186 is received within the locking channel 196. In some embodiments, the operator-engaging segment 208 may form an interference fit (or snap fit) with the section body 112. For example, a portion of the section body 112 that defines the locking channel 196 may be sized relative to the operator-engaging segment 208 to form an interference fit. In some embodiments, the fastener 186 may include a projection (not shown) that is received within a corresponding cavity (not shown) of the clamp frame 102 that prevents the fastener 186 from being withdrawn.

To release the first and second clamp sections 106, 108 of the clamp frame 102, the fastener 186 may be rotated in the opposite direction to remove the operator-engaging element 208 from the locking channel 196 and the fastener 186 may be moved in the withdrawal direction along the pin axis 210. The coupling end 118 may then be moved in a lateral direction, such as about 90° with respect to the pin axis 210, with the outward force 204 and thereby detach the coupling end 118 and the coupling base 122.

Accordingly, the embodiment of FIGS. 1-8 provides a clamping device 100 that may be used to secure one or more longitudinal elements with respect to an external structure. Unlike known clamping devices, the clamping device 100 may be utilized without a tool. For example, the profiles of the inner and outer surfaces 170, 198 may provide a primary tool-less locking mechanism and the fastener 186 may provide a secondary tool-less locking mechanism. In this case, the fastener 186 is not considered a tool because the fastener 186 remains with the clamping device 100 during operation. It is noted, however, that other embodiments do not include more than one locking mechanism. For example, other embodiments may only include the primary locking mechanism or only include the secondary locking mechanism. It is also noted that other embodiments may be implemented using a tool that does not remain with the clamping device. Such an embodiment is described below with respect to FIGS. 11 and 12.

Embodiments may also enable a person to pre-mount the clamping device 100 and then position the longitudinal elements within the clamping device 100. For example, the thru-hole 154 (FIG. 1) of the mounting flange 150 allows the person to secure the clamping device 100 to an external structure (e.g., wall, panel). In some cases, the mounting flange 150 may be secured to the external structure prior to positioning the longitudinal elements within the passage 140 defined by first and second clamp sections 106, 108. While secured to the external structure, the person may position the longitudinal elements within the space defined by the clamp section 106 and/or the space defined by the clamp section 108. As described above, the person may position the longitudinal elements through multiple steps. For example, after a first longitudinal element is positioned within the space defined by one of the clamp sections, the person may release the first longitudinal element, retrieve a second longitudinal element, and then position the second longitudinal element within one of the spaces defined by the clamp sections.

In some embodiments, the clamping device 100 may allow utilization of a partially-closed configuration. For example, the coupling end 118 (FIG. 4) may be configured to attach to the coupling base 122 (FIG. 5) in a partially-closed configuration. In this configuration, less than all of the grip elements 188 (e.g., one or two of the grip elements 188) may engage the corresponding mating elements 190. The partially-closed configuration may hold the longitudinal elements that have already been positioned within the passage 140 while a person retrieves other longitudinal elements or addresses other matters away from the clamping device 100. The person may then return to the clamping device 100 and move the clamping device 100 into the fully closed configuration. Compared to the fully closed configuration, the partially-closed configuration may require less effort to move the clamping device 100 to the open configuration. Nonetheless, the clamping device 100 may temporarily hold the longitudinal elements while in the partially-closed configuration.

Figure 9:
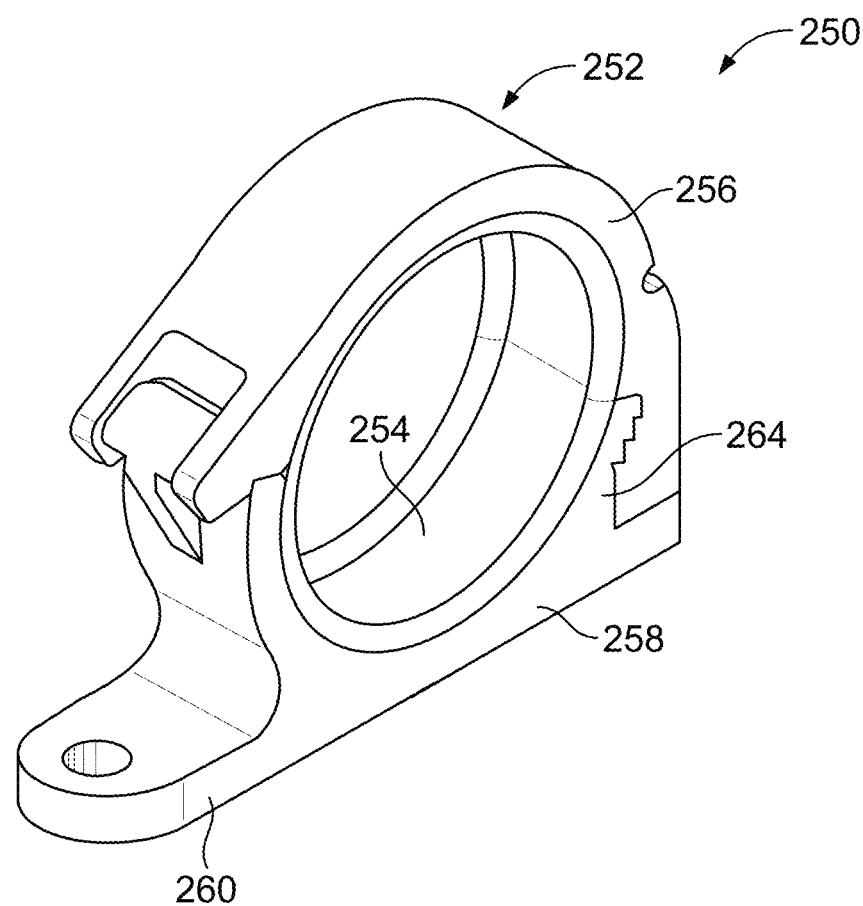
FIG. 9 is a perspective view of a clamping device formed in accordance with an embodiment when the clamping device is in a closed configuration. The secondary locking mechanism is located on the opposite side of the clamping device away from a mounting hole.

FIG. 9 is a perspective view of a clamping device 250 formed in accordance with an embodiment when the clamping device 250 is in a closed configuration. The clamping device 250 may include features that are similar to the features of the clamping device 100 (FIG. 1). For example, the clamping device 250 includes a clamp frame 252 and an optional inner layer 254 that is coupled to the clamp frame 252. In the illustrated embodiment, the clamp frame 252 includes a first clamp section 256 and a second clamp section 258. The first and second clamp sections 256, 258 are discrete structures that are configured to be coupled to one another to form the clamp frame 252. Similar to the clamping device 100, the first and second clamp sections 256, 258 have an articulated relationship in which the first and second clamp sections 256, 258 are rotatable about an axis of rotation.

The clamping device 250 also includes a mounting flange 260 that is similar to the mounting flange 150 (FIG. 1). The mounting flange 260, however, is located on an opposite side of the clamp frame 252 compared to the mounting flange 150. More specifically, the mounting flange 150 is attached to and projects away from the coupling base 122 (FIG. 1). The mounting flange 260 is coupled to the second clamp section 258 but positioned away from a coupling base 264.

Figure 10:
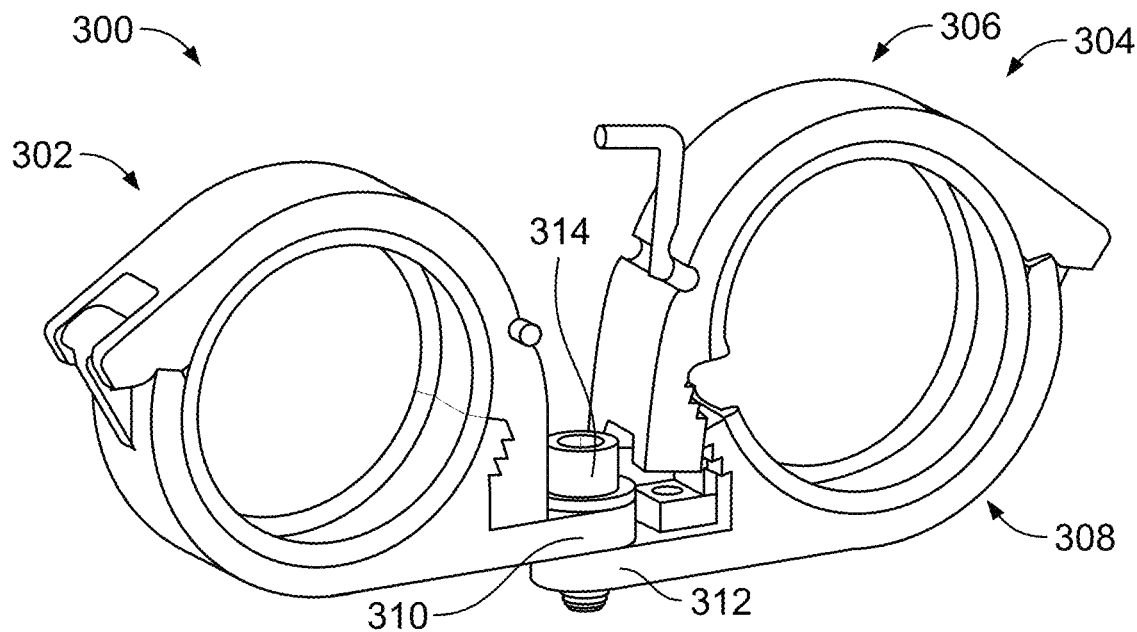
FIG. 10 is a perspective view of a clamping assembly formed in accordance with an embodiment that includes two clamping devices.

FIG. 10 is a perspective view of a clamping assembly 300 formed in accordance with an embodiment that includes first and second clamping devices 302, 304. The configuration shown in FIG. 10 may be referred to as a butterfly configuration. The clamping devices 302, 304 may be similar or identical to the clamping device 100 (FIG. 1). The clamping device 302 is in a locked and closed configuration in FIG. 10. The clamping device 304 is not in the closed configuration. As shown, the clamping device 304 includes first and second clamp sections 306, 308 that have initially engaged each other. In some embodiments, the first and second clamping devices 302, 304 may be configured to allow either of the clamping devices to be opened or closed while the other clamping device is closed. For example, the first clamp sections 306 may be shaped to clear the first clamp section of the other clamping device when opening or closing. In other embodiments, however, the first and second clamping devices 302, 304 may be configured to be closed and opened in accordance with a predetermined sequence.

The clamping devices 302, 304 include mounting flanges 310, 312, respectively. Each of the mounting flanges 310, 312 includes a thru-hole (not shown) that is configured to receive hardware 314 (e.g., bolt) for securing the clamping assembly 300 to an external structure (not shown). As shown, the mounting flanges 310, 312 are stacked with respect to each other such that the thru-holes are aligned and may each receive the hardware 314.

FIGS. 11 and 12 are perspective views of a clamping device 400 formed in accordance with an embodiment when the clamping device 400 is in an open configuration and a closed configuration, respectively. The clamping device 400 may be similar to the clamping device 100 (FIG. 1). For example, the clamping device 400 includes a clamp frame 402 and an optional inner layer 404 that is coupled to the clamp frame 402. The clamp frame 402 includes a first clamp section 406 and a second clamp section 408. The first and second clamp sections 406, 408 are discrete structures that are configured to be coupled to one another to form the clamp frame 402. Similar to the clamping device 100, the first and second clamp sections 406, 408 have an articulated relationship in which the first and second clamp sections 406, 408 are rotatable about an axis of rotation.

The first and second clamp sections 406, 408 include a coupling end 418 and a coupling base 422, respectively. The coupling end 418 and the coupling base 422 may have surfaces with profiles that are similar to the surfaces 170, 198 (FIGS. 4 and 5, respectively). Unlike the coupling end 118 (FIG. 1) and the coupling base 122 (FIG. 1), the coupling end 418 and the coupling base 422 are configured to receive a threaded pin 424 (e.g., screw). For example, the coupling end 418 includes a passage 426 (FIG. 11) having the threaded pin 424 disposed therein. The coupling base 422 includes a passage 428 (FIG. 11) that is configured to receive the threaded pin 424. For example, the passage 428 may be defined by threads that engage the threaded pin 424. When the clamp frame 402 is in the closed configuration as shown in FIG. 12, the threaded pin 424 may be secured to the second clamp section 408. Accordingly, the threaded pin 424 is a fastener that is inserted through each of the passages 426, 428.

FIG. 13 illustrates a clamping device 500 that is similar to the clamping devices described herein. For example, the clamping device 500 includes first and second clamp sections 506, 508. As shown, a secondary locking mechanism 585 of the clamping device 500 includes a threaded pin 524 (e.g., screw). Also shown, the clamping device 500 includes first and second mounting flanges 550A, 550B. The first and second mounting flanges 550A, 550B are located opposite each other. Each of the mounting flanges 550A, 550B includes a thru-hole 554 for receiving hardware. Embodiments using more than one mounting flange may provide a more secure attachment to the external structure.

Figure 14:
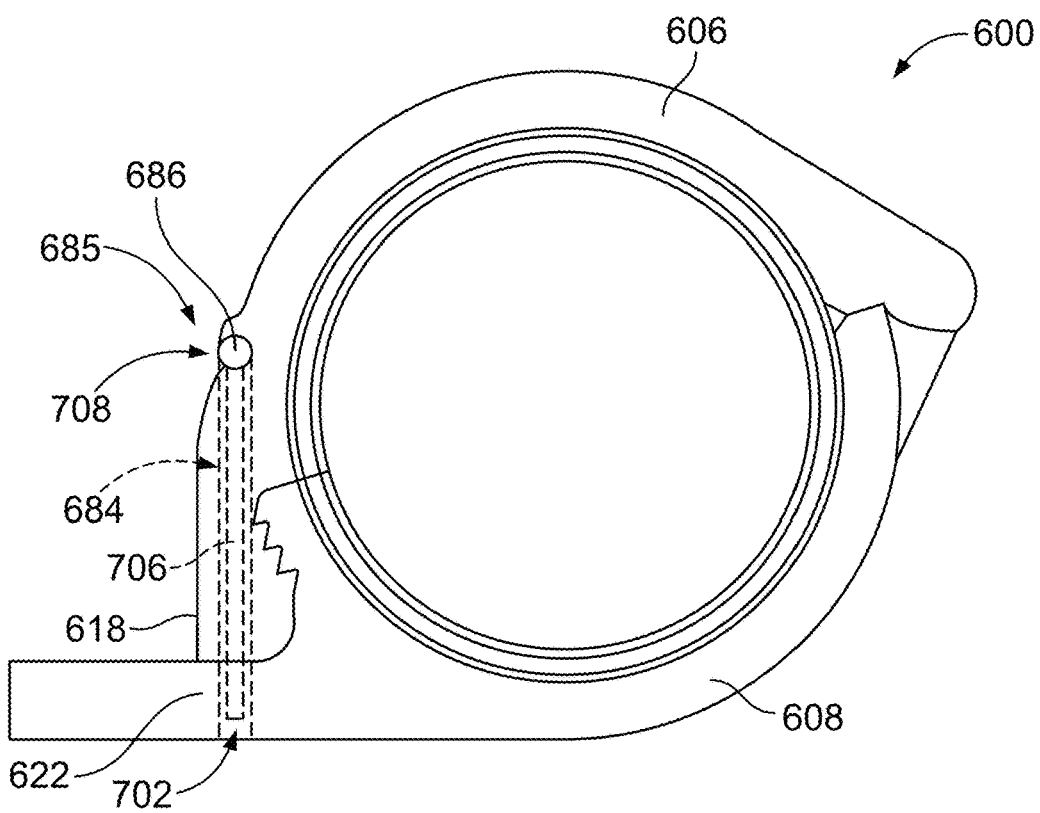
FIG. 14 illustrates a clamping device having a secondary locking mechanism in accordance with an embodiment that includes a movable fastener.

FIG. 14 illustrates a clamping device 600 that is similar to the clamping devices described herein. The clamping device 600 includes first and second clamp sections 606, 608. A secondary locking mechanism 685 of the clamping device 600 includes a fastener 686. The fastener 686 may be similar to or identical to the fastener 186. For example, the fastener 686 includes a locking segment 706 and an operator-engaging segment or handle 708 that is coupled to the locking segment 706. The fastener 686 may have a non-linear structure. The locking segment 706 is disposed within a passage 684 of a coupling end 618 of the first clamp section 606 and is configured to be inserted into a passage 702 of a coupling base 622 of the second clamp section 606. The operator-engaging segment 708 is accessible to an individual (e.g., technician).

Figure 15:
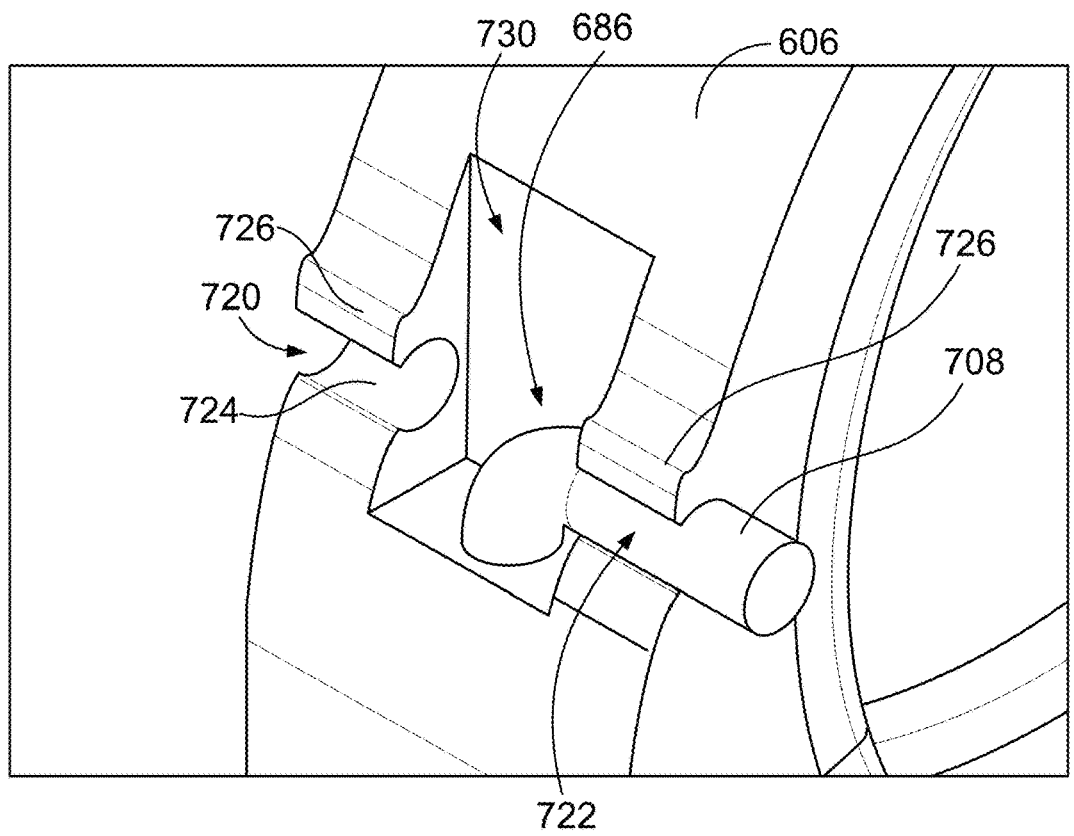
FIG. 15 illustrates the movable fastener of the secondary locking mechanism being in a first position.
Figure 16:
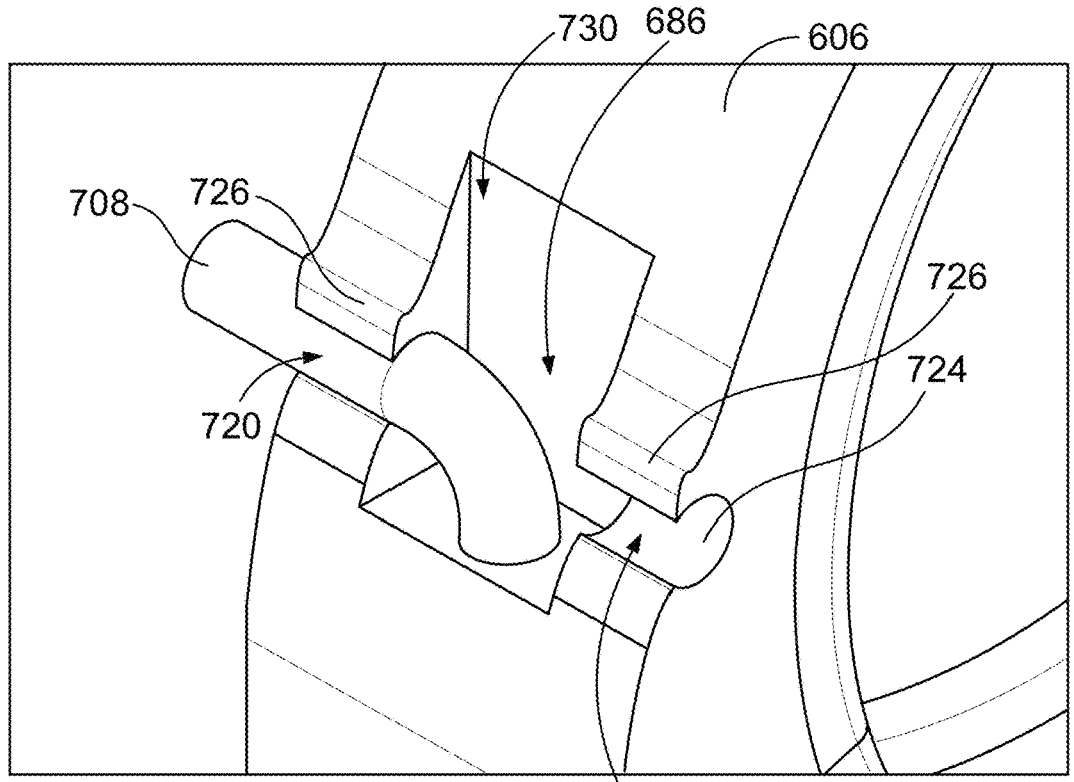
FIG. 16 illustrates the movable fastener of the secondary locking mechanism being in a second position.

FIGS. 15 and 16 provide enlarged views of a portion of the secondary locking mechanism. In the illustrated embodiment, the operator-engaging segment 708 is configured to be rotated in one of two positions to secure the operator-engaging segment 708 to the first clamp section 606. More specifically, the first clamp section 606 is shaped to form first and second locking channels 720, 722. The first clamp section 606 is also shaped to form a recess 730 where the operator-engaging segment 708 is freely movable. Each of the locking channels 720, 722 is defined by a contoured surface 724 that is sized and shaped to grip the operator-engaging segment 708. For example, the contoured surface 724 circumferentially surrounds more than half of the corresponding operator-engaging segment 708. The first clamp section 606 may include a grip finger 726. The grip finger 726 may permit a limited amount of deflection when the operator-engaging segment 708 engages the grip finger 726 and advances into the corresponding locking channels. The operator-engaging segment 708 and the contoured surface 724 form an interference fit such that the operator-engaging segment 708 does not inadvertently exit the corresponding locking channels during operation. In the illustrated embodiment, the secondary locking mechanism allows the user to rotate the fastener 686 in either direction. Although the illustrated embodiment shows two locking channels 720, 722, other embodiments may include only one locking channels.

Figure 17:
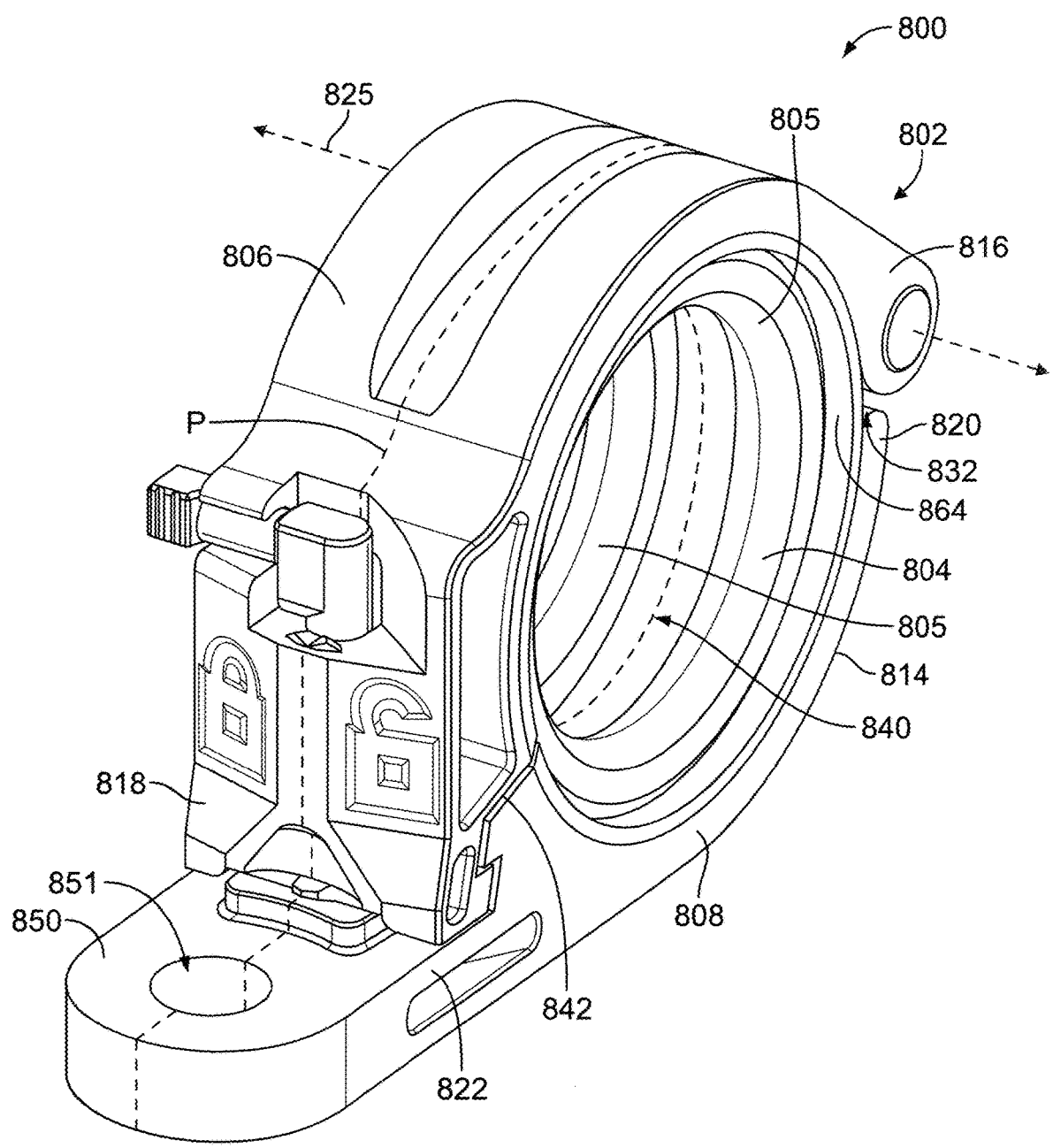
FIG. 17 is a perspective view of a clamping device in accordance with an embodiment.

FIG. 17 is a perspective view of a clamping device 800 formed in accordance with an embodiment. The clamping device 800 may include features that are similar or identical to features of other clamping devices described herein (e.g., clamping device 100, 302, 304, 400, 500, 600). The clamping device 800 is configured to hold one or more longitudinal elements (not shown) extending through a working passage 840 of the clamping device 800. Optionally, the clamping device 800 may be secured to an external structure.

The clamping device 800 includes a clamp frame 802 and a locking pin 815 that holds the clamp frame 802 in a closed position. Optionally, an inner layer 804 may be coupled to the clamp frame 802 and define the working passage 840. The inner layer 804 includes one or more ridges 805 that surround (e.g., encircle) the working passage 840. For embodiments that do not include the inner layer 804, the clamp frame 802 may define the working passage 840.

In the illustrated embodiment, the clamp frame 802 includes a first clamp section 806 and a second clamp section 808. The first and second clamp sections 806, 808 are discrete structures that are configured to be coupled to one another to form the clamp frame 802. In FIG. 17, the clamp frame 802 is in a closed configuration. In the closed configuration, the clamp frame 802 can wrap around and hold the longitudinal elements (not shown). The first and second clamp sections 806, 808 are coupled to each other in the closed configuration. As described herein, the locking pin 815 operates as a secondary locking mechanism that holds the first and second clamp sections 806, 808 to each other. The locking pin 815 is activatable after the clamp frame 802 is held in a closed configuration by a first locking mechanism. The locking pin 815 may also be part of an opening mechanism that decouples the first and second clamp sections 806, 808.

In other embodiments, however, the clamp frame 802 may include a continuous belt or collar that is configured to be wrapped around the longitudinal elements. For example, the first and second clamp sections 806, 808 may be portions of a continuous strip or band of a flexible element, such as a plastic or metal. The continuous strip or band may be other materials or may include other materials. In such an embodiment, the clamp frame 802 may move between the open configuration and the closed configuration and be secured to itself as described herein.

Figure 18:
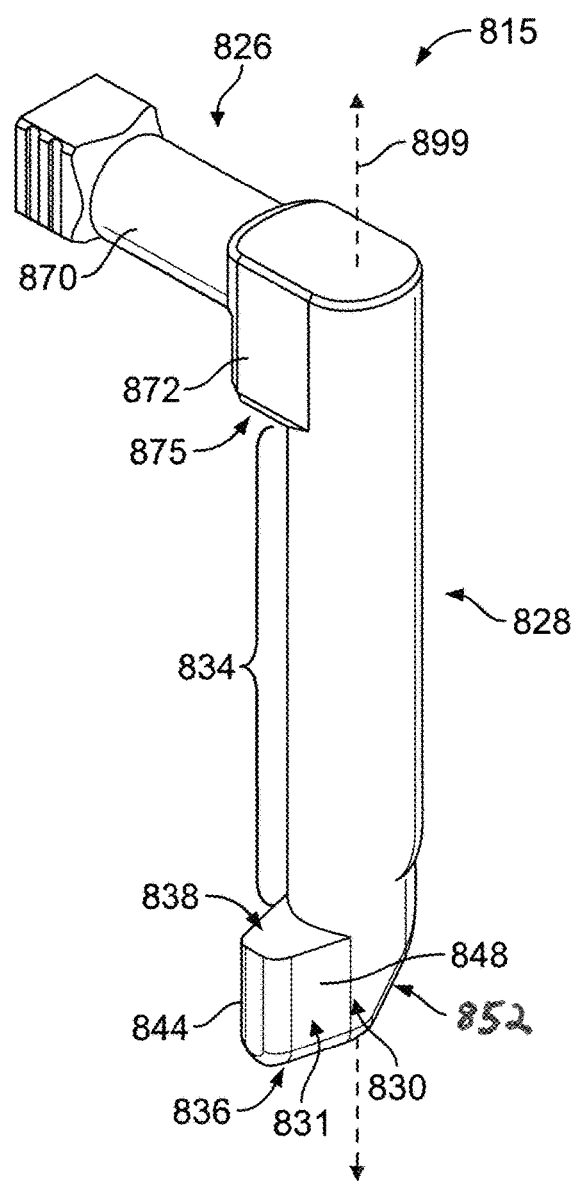
FIG. 18 is an isolated view of a locking pin that may be used with the clamping device of FIG. 17.

In some embodiments, the first clamp section 806 and the second clamp section 808 may comprise a rigid or semi-rigid material, such as plastic (e.g., polyether ether ketone (PEEK)) or metal (e.g., aluminum or alloy thereof). In some embodiments, at least one of the first clamp section 806 or the second clamp section 808 are molded to include the features described herein. Alternatively or in addition to being molded, at least one of the first clamp section 806 or the second clamp section 808 may be bent, etched, 3D-printed, or otherwise shaped to include the features described herein. In the illustrated embodiment, the first clamp section 806 and the second clamp section 808 may comprise only a single material. The single material may be different from the material of the inner layer 804 (FIG. 18). In other embodiments, however, the first clamp section 806 and the second clamp section 808 may include discrete elements or features that are coupled to each other to form the section bodies.

The first clamp section 806 has a joint end 816 and a coupling end 818. The first clamp section 806 extends lengthwise between the joint end 816 and the coupling end 818. The second clamp section 808 includes a joint end 820 and a coupling base 822. Optionally, the second clamp section 808 includes a mounting flange or element 850 that is coupled to a section body 814 of the second clamp section 808. The mounting flange 850 may include a thru-hole 851 that is configured to receive hardware (not shown), such as a pin or plug, for securing the clamping device 800 to the external structure.

The joint ends 816 and 820 are configured to be movably coupled to each other such that the first and second clamp sections 806, 808 may move relative to each other between the open configuration and the closed configuration. As shown in FIG. 17, the joint ends 816, 820 are rotatably coupled about an axis of rotation 825. The first and second clamp sections 806, 808 are configured to rotate away from one another. For cases in which the second clamp section 808 is secured to another structure, the first clamp section 806 may rotate away from the second clamp section 808. The first and second clamp sections 806, 808 may move along a plane P that bisects the first and second clamp sections 806, 808 as indicated by a dashed line intersecting the first and second clamp sections 806, 808. As described herein, the joint ends 816, 820 may include features that form a retaining mechanism, which holds the first and second clamp sections 806, 808 in the open configuration, and a blocking mechanism, which prevents the first and second clamp sections 806, 808 from over-rotating or hyper-extension.

Similar to the first and second clamp sections 106, 108 (FIG. 1), the first and second clamp sections 806, 808 may form a pinching gap 832 proximate to the joint ends 816, 820, respectively. For example, the pinching gap 832 may be defined between portions of the joint ends 816, 820. The inner layer 804 is configured to extend over or across the pinching gap 832 at a bridge portion 864 of the inner layer 804 to prevent, for example, longitudinal elements being inadvertently positioned within the pinching gap 832. The inner layer 804 may comprise a flexible or stretchable material, such as those described above with respect to the inner layer 104 (FIG. 1). The inner layer 804 may also be configured to be in a relaxed state when the clamp frame is in the closed configuration and a stretched or tensed state when the inner layer 804 is in the open configuration. In the stretched state, the inner layer 804 may provide a retracting force that facilitates closing the clamp frame 802.

When the clamp frame 802 is in the closed configuration, the inner layer 804 defines the working passage 840 through which the longitudinal element(s) extend. In some embodiments, the inner layer 804 essentially defines the entire passage 840, except for a seam 842 at an interface between the first and second clamp sections 806, 808.

Figure 19:
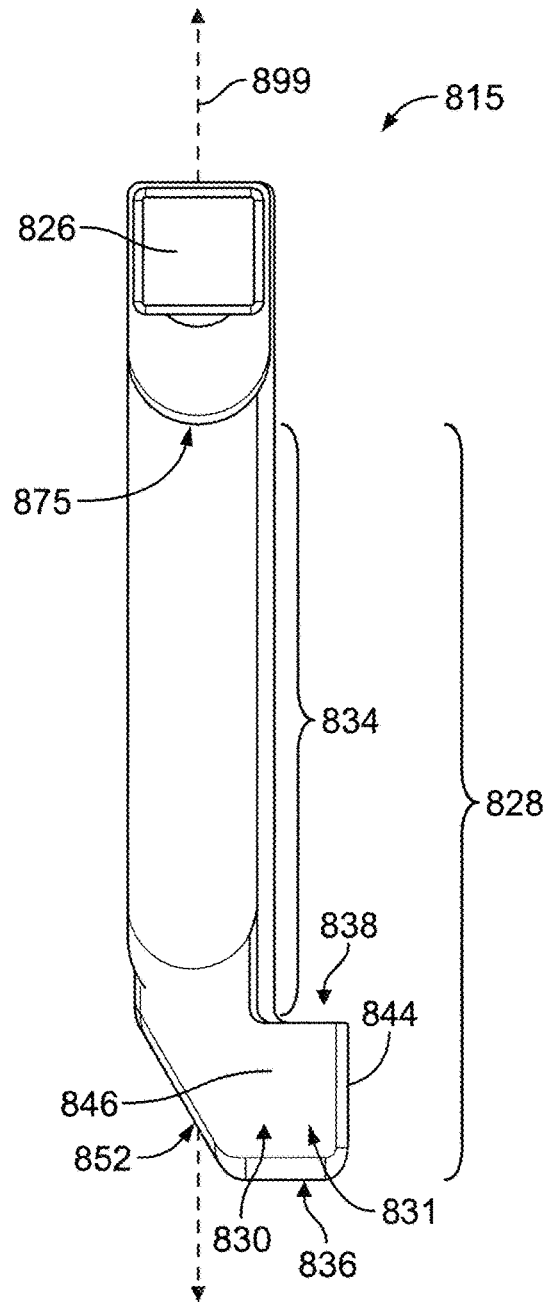
FIG. 19 is a side view of the locking pin that may be used with the clamping device of FIG. 17.

FIG. 18 is a perspective view of the locking pin 815, and FIG. 19 is a side view of the locking pin 815. The locking pin 815 includes a handle 826 and a pin segment 828. A pin axis 899 extends through the pin segment 828. The handle 826 and the pin segment 828 have a non-linear configuration. For example, the handle 826 extends radially away from the pin segment 828 (or the pin axis 899) in a linear manner in FIGS. 18 and 19. The handle 826 is not required, however, to be linear. Instead, the handle 826 can be dimensioned so that a sufficient amount of torque can be applied manually for rotating the locking pin 815.

The pin segment 828 includes a shaft 834 and a distal lobe 830 that is coupled to the shaft 834. In the illustrated embodiment, the distal lobe 830 is positioned at a distal end of the shaft 834. The shaft 834 extends between the handle 826 and the distal lobe 830. The handle 826 is configured to be manually activated by a user. For example, a user may engage the handle 826 (e.g., with one or more fingers) and rotate the locking pin 815 about the pin axis 899. The handle 826 includes a hold section 872. The hold section 872 extends along the shaft 834 and is sized and shaped to engage a portion of the clamp frame 802 (FIG. 17). More specifically, the hold section 872 includes a wipe surface 875 that is configured to slidably engage a surface of the clamp frame 802. In the illustrated embodiment, the wipe surface 875 is convex and is shaped to receive or otherwise engage a surface of the clamp frame 802. In other embodiments, the wipe surface 875 may be concave or have another shape.

The distal lobe 830 projects radially from the pin axis 899. The distal lobe 830 is configured to engage a portion of the second clamp section 808 (FIG. 17). The distal lobe 830 may be used for multiple purposes or functions. In particular embodiments, different areas of an external surface 831 of the distal lobe 830 are designed to engage different areas of a base surface 930 (shown in FIG. 21) of the second clamp section 808 as the locking pin 815 is rotated and/or when the locking pin 815 is held in a designated position.

As described herein, the distal lobe 830 may be designed for one or more functions. For example, the distal lobe 830 may be configured to lock and hold the clamp frame 802 in the closed configuration. The distal lobe 830 may be used to unlock the first and second clamp section 806, 808 of the clamp frame 802 when the clamp frame 802 is in a closed configuration so that the first and second clamp sections 806, 808 may be moved to the open configuration. In particular, the locking pin 815 may not only unlock the clamp frame 802 but also provide a positive force that dislodges the first and second clamp sections 806, 808. The distal lobe 830 may also be sized and shaped relative to a base cavity 902 that receives the distal lobe 830 so that the distal lobe 830 may be removed to permit the first clamp section 806 to move away from the second clamp section 808.

As shown in FIGS. 18 and 19, the distal lobe 830 includes a toe area 844, a sidewall 846, and a sidewall 848. The toe area 844 may also be referred to as a toe for some embodiments. The sidewalls 846, 848 are on generally opposite sides of the distal lobe 830 and face in generally opposite directions. The sidewall 848 may function as a push-off or camming surface that engages the base surface 930 (FIG. 24) of the clamp section 808. The toe area 844 joins the sidewalls 846, 848. The distal lobe 836 also includes a heel 852, which is positioned opposite the toe area 844 and extends between the sidewalls 846, 848. In the illustrated embodiment, the pin axis 899 extends through the heel 852. As described herein, the distal lobe 836 is configured to be rotated about the pin axis 899 and engage one or more areas of the base surface 930. The heel 852 is designed to avoid the base surface 930, thereby allowing the distal lobe 830 to exit the base cavity 902. As shown in FIGS. 18 and 19, the heel 852 is a generally planar surface that intersects the pin axis 899 at a non-orthogonal area.

Although FIGS. 18 and 19 illustrated one configuration of the locking pin 815 and, in particular, the distal lobe 830, it should be understood that the locking pin 815 may have different design in other embodiments. For example, the handle 826 may be L-shaped, and the distal lobe 830 may not form the most distal portion of the pin segment 828.

Figure 20:
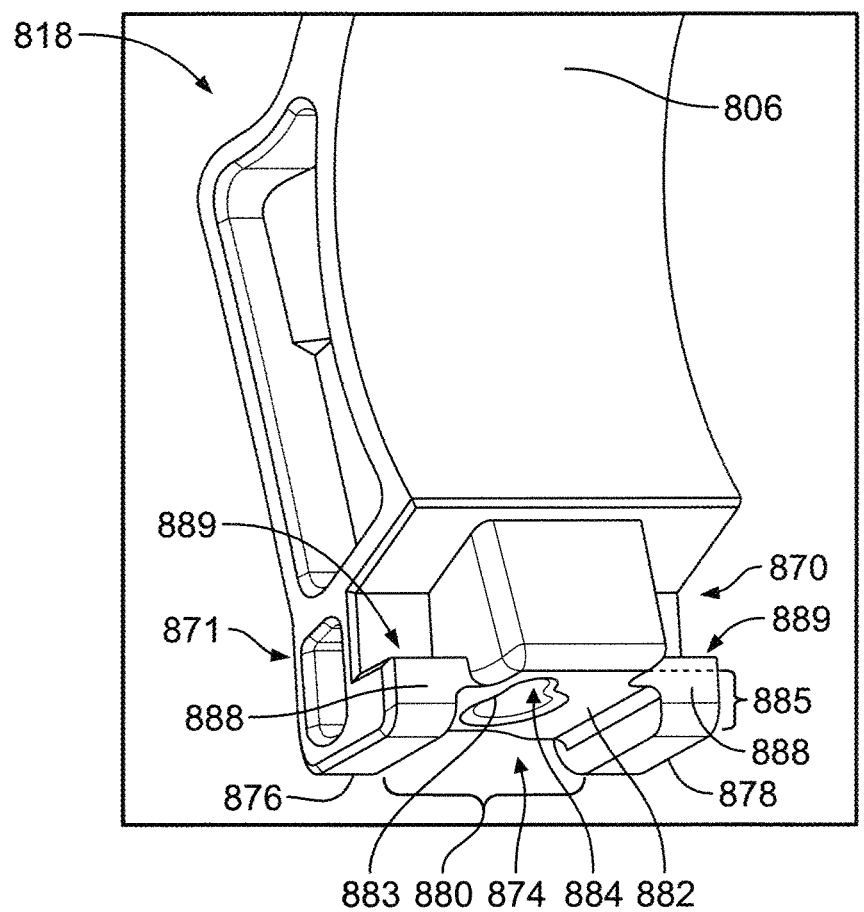
FIG. 20 is a perspective view of a coupling end that may be used with the clamping device of FIG. 17.
Figure 21:
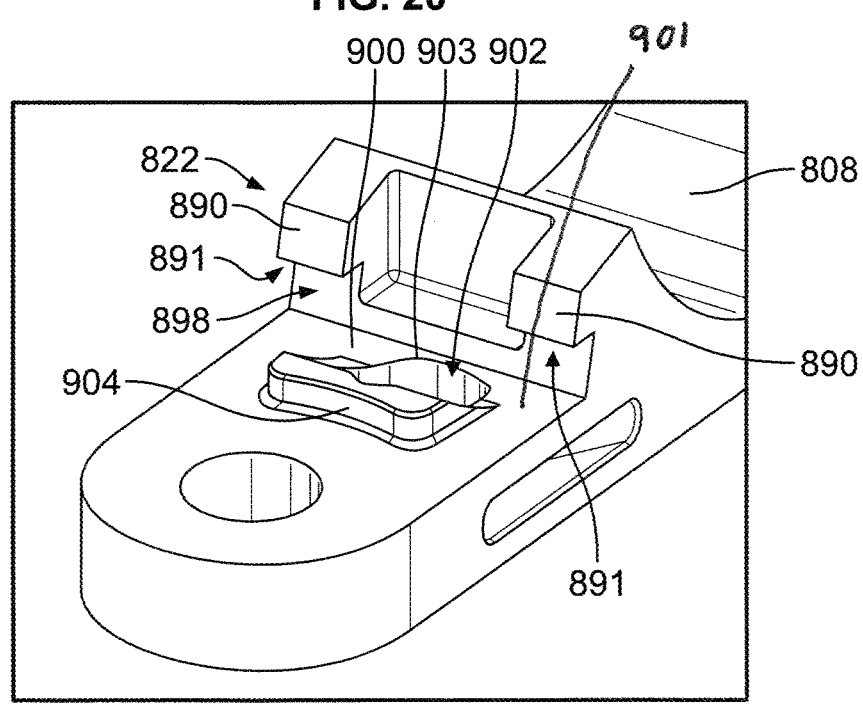
FIG. 21 is a perspective view of a coupling base that may be used with the clamping device of FIG. 17.

FIGS. 20 and 21 are perspective views of the coupling end 818 and the coupling base 822, respectively. The coupling end 818 is configured to form a locked engagement with the coupling base 822 such that the first clamp section 806 (FIG. 20) and the second clamp section 808 (FIG. 21) are secured to each other. In the locked engagement, the clamping device 800 (FIG. 17) maintains the closed configuration. With respect to FIG. 20, the coupling end 818 has an inner surface 870 and an outer surface 871 that face in generally opposite directions. The coupling end 818 also includes a mating face or end 874 that extends between the inner and outer surfaces 870, 871. The mating face 874 and the inner surface 870 are configured to directly interface with the second clamp section 808 (FIG. 21). The coupling end 818 includes first and second tabs 876, 878 that are separated by a section space 880. An end surface 882 of the coupling end 818 extends between the first and second tabs 876, 878. The first and second tabs 876, 878 project away from the end surface 882 such that a spacing 885 is formed between the first second tabs 876, 878. The spacing 885 has a height that extends between the end surface 882 and a stage surface 901 of the coupling base 822 (FIG. 21).

The coupling end 818 includes a passage 884 extending therethrough having an opening 883 at the end surface 882. The pin segment 828 (FIG. 18) of the locking pin 815 (FIG. 17) is inserted through the passage 884. The distal lobe 830 is configured to at least partially reside within the spacing 885.

With respect to FIG. 21, the coupling base 822 is shaped to attach to the coupling end 818 (FIG. 20). More specifically, the inner surface 870 (FIG. 20) of the coupling end 818 may be shaped to attach to the coupling base 822 (FIG. 21) and prevent inadvertent removal of the first clamp section 806 away from the second clamp section 808. The coupling base 822 has an outer surface 898 that that is configured to engage the inner surface 870. The coupling base 822 also includes a stage 900. The stage 900 has the stage surface 901 that includes an opening 903 to a base cavity or passage 902 of the coupling base 822. The stage 900 also includes a ridge 904. The ridge 904 may facilitate retaining the coupling end 818 in the closed configuration.

The inner surface 870 (FIG. 18) and the outer surface 898 of the coupling base 822 have profiles that form the locked engagement to hold the clamp frame 802 in the closed configuration. The locked engagement may be achieved by grip elements 888 (FIG. 20) and mating elements 890 (FIG. 21). The coupling end 818 includes the grip elements 888. As shown, the grip elements 888 are portions of the first and second tabs 876 in the illustrated embodiment. The mating elements 890 are separated by spacing which engage the mating elements 890 of the coupling base 822. The grip elements 888 and the mating elements 890 include grip and mating surfaces 889, 891, respectively. The grip and mating surfaces 889, 891 are shaped such that when a grip surface 889 and a mating surface 891 engage each other, the grip and mating surfaces 889, 891 prevent the first clamp section 806 from being inadvertently removed. For example, the grip surface 889 is tilted slightly back toward the coupling end 818, and the mating surface 891 is tilted slightly toward the coupling base 820. Each of the grip elements 888 are configured to be positioned between the mating surface 891 and the stage surface 901.

When the grip elements 888 are held between the corresponding mating surfaces 891 and stage surfaces 901, the clamp frame 802 is held in the closed configuration by the frictional forces between the grip elements 888 and the corresponding mating surfaces 891 and stage surfaces 901. As such, the grip elements 888 and the mating elements 890 may form a first locking mechanism. After the first locking mechanism is initiated, the secondary locking mechanism (e.g., the locking pin 815, the coupling end 818, and the coupling base 822) may be activated.

Figure 22:
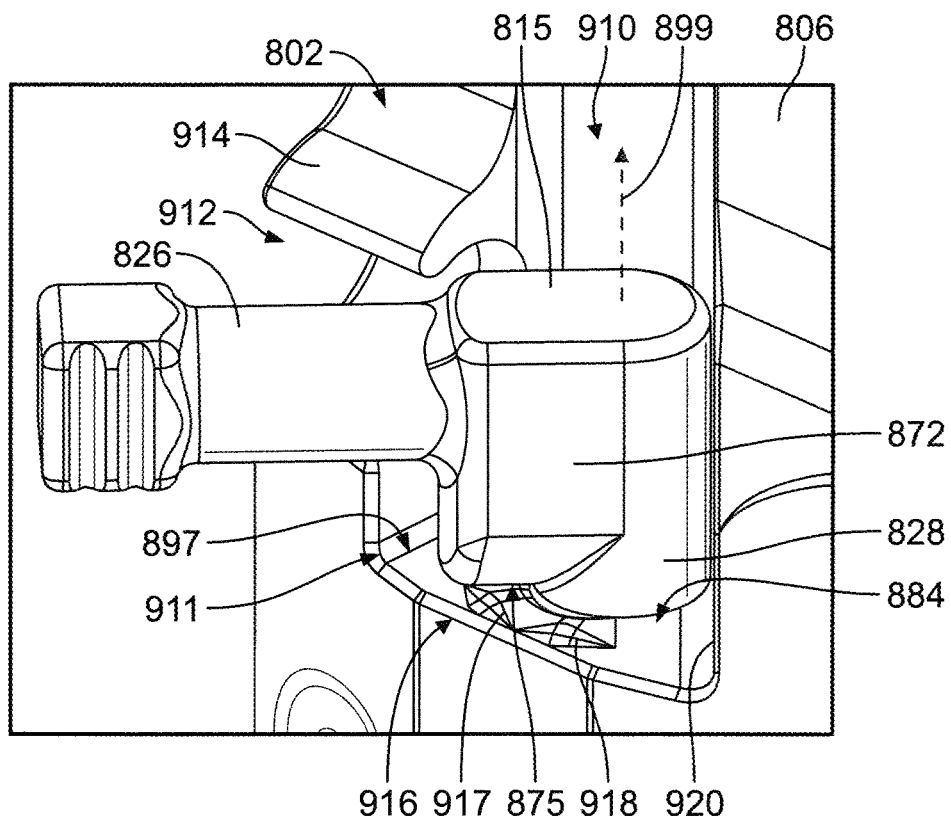
FIG. 22 shows a portion of the clamping device, wherein a handle of the locking pin is in a neutral position.
Figure 23:
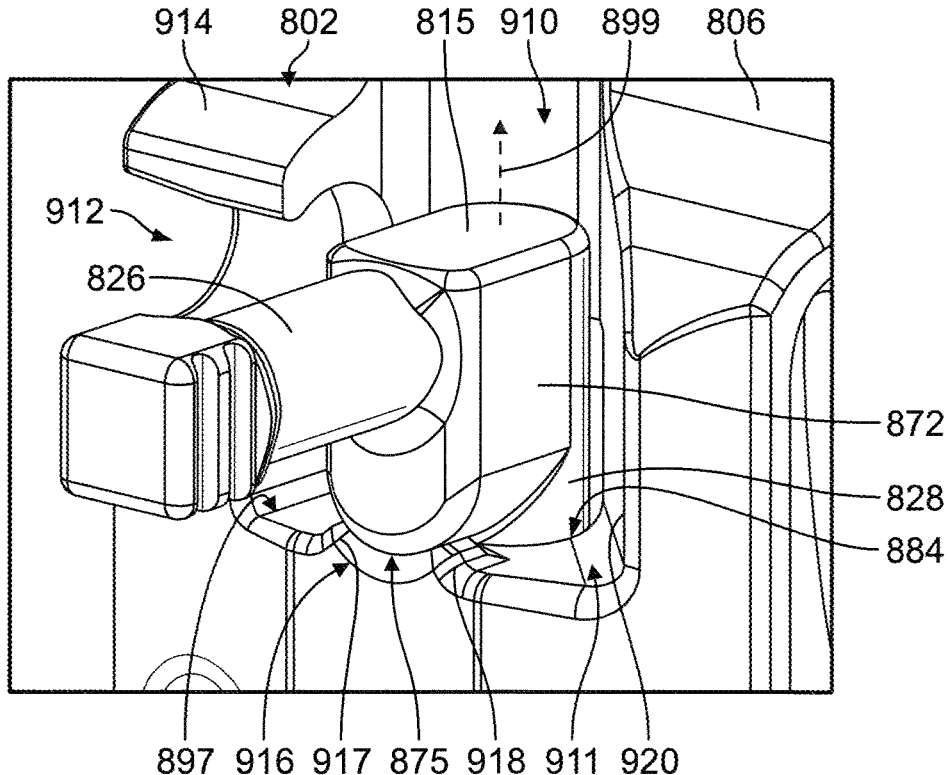
FIG. 23 shows a portion of the clamping device, wherein the handle is between a neutral position and an unlocking position.

FIGS. 22 and 23 are perspective views of a portion of the clamp frame 802 that engages the handle 826 of the locking pin 815. The first clamp section 806 of the clamp frame 802 includes an exterior surface 910. The pin segment 828 extends through an opening 887 of the passage 884 that is defined by a base area 897 of the exterior surface 910. The pin segment 828 extends along the pin axis 899. FIG. 22 shows the handle 826 when the locking pin 815 is between a locked position and a neutral position. FIG. 23 shows the handle 826 when the locking pin 815 is in the neutral position. The exterior surface 910 forms a recess 911.

In the illustrated embodiment, the recess 911 represents a space where the handle 826 of the locking pin 815 moves when manually activated. The exterior surface 910 also defines a gripping channel 912. The first clamp section 806 includes at least one finger 914 the projects away from a portion of the exterior surface 910 and defines the gripping channel 912. The gripping channel 912 is sized and shaped such that the handle 826 forms an interference fit with the exterior surface 910 that defines the gripping channel 912. The exterior surface 910 also defines at least one detent 916. In the illustrated embodiment, the detent 916 includes first and second protuberances 917, 918. The protuberances 917, 918 are spaced apart from each other to define a nest that receives the hold section 872 of the handle 826 when the handle 826 is in the neutral position. More specifically, the detent 916 may engage the hold section 872 when they handle 826 is in the neutral position. As shown, the wipe surface 875 is held within the nest between the protuberances 917, 918. The protuberances 917, 918 cradle the handle 826 in the neutral position and impede inadvertent rotational movement of the locking pin 815. In some embodiments, the user may manually rotate the first clamp section 806 about the axis of rotation 825 (FIG. 17) without the distal lobe 830 (FIG. 18) blocking such movement.

The recess 911 is also defined by a blocking wall 920. The blocking wall 920 may function as a positive stop that blocks the handle 826 from rotating further about the pin axis 899. Optionally, the blocking wall 920 and the protuberance 918 of the detent 916 may also define a space where the hold section 872 can be cradled. For example, the handle 826 may be held between the protuberance 918 and the blocking wall 920 as the clamp section 806 is rotated away from the clamp section 808.

Figure 24:
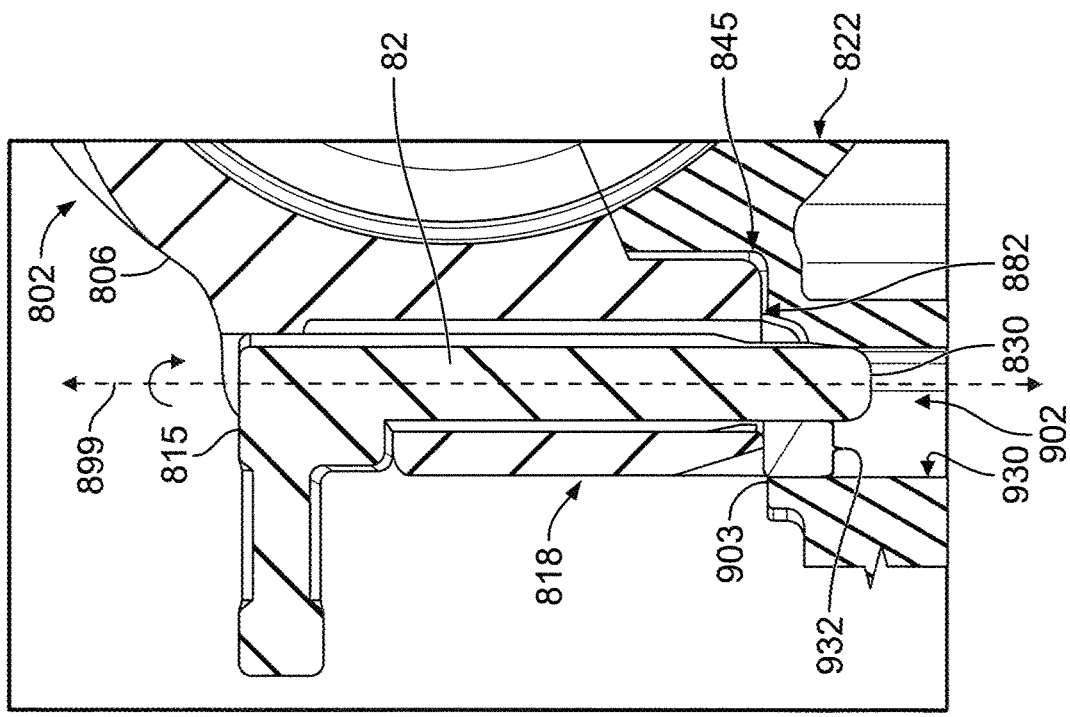
FIG. 24 is a cross-sectional view of a portion of the clamping device of FIG. 17 illustrating a secondary locking mechanism in greater detail.

FIGS. 24-29 illustrate how the locking pin 815 may be used to secure and hold the clamp frame 802 in the closed configuration or may be used to disengage the first locking mechanism. More specifically, the locking pin 815 can be used to dislodge the first and second clamp sections 806, 808 so that the clamp frame 802 can move from the closed configuration to the open configuration. FIG. 24 is a cross-sectional view of the clamp frame 802 and the locking pin 815. As shown, the coupling end 818 and the coupling base 822 are in a locked engagement and have a seam 845 therebetween. The passage 884 and the base cavity 902 are aligned and the pin segment 828 of the locking pin 815 extends through the passage 884 and into the base cavity 902. At least a portion of the distal lobe 830 is disposed within the base cavity 902.

Figure 25:
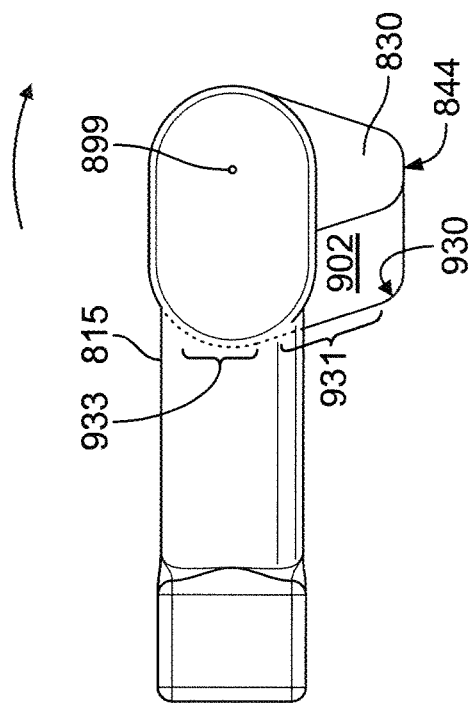
FIG. 25 shows the locking pin and a base cavity that receives a distal lobe of the locking pin, wherein the locking pin is in a neutral position.

FIG. 25 is a plan view of the locking pin 815 relative to a base surface 930 that defines the base cavity 902 of the coupling base 822 (FIG. 17). With reference to FIGS. 24 and 25, the base cavity 902 and the passage 884 are aligned with one another such that the pin axis 899 extends through the base cavity 902 and through the passage 884. The distal lobe 830 is positioned within the base cavity 902. The opening 903 to the base cavity 902 is positioned and shaped relative to the first clamp section 806 and the distal lobe 830 so that the distal lobe 830 may advance through the opening 903 and into the base cavity 902 as the first and second clamp sections 806, 808 are moved to the closed configuration. Accordingly, the distal lobe 830 is positioned so that the base surface 930 permits the distal lobe 830 to exit or enter the base cavity 902 while the locking pin 815 is in the neutral position.

The neutral position enables a user to temporarily hold the clamp frame 802 in the closed configuration. For example, a user may position a longitudinal element through the working passage 840 then close the clamp frame 802, wherein the inner surface 870 of the coupling end 818 and the outer surface 898 of the coupling base 822 form the initial locked engagement. While the clamp frame 802 is held in position by the first locking mechanism, the locking pin 815 is in the neutral position and does not provide any additional forces for holding the clamp frame 802 in the closed configuration. For example, the user may freely rotate the coupling end 818 away from the coupling base 822 without the distal lobe 830 blocking such rotational movement. As shown in FIG. 24, an exit gap 932 exists between the distal lobe 830 and the base surface 930. The exit gap 932 is configured such that the distal lobe 830 may clear the opening 903 of the base cavity 902 when the user attempts to rotate the coupling end 818 toward the coupling base 822. Accordingly, the neutral position of the locking pin 815 allows the first locking mechanism to temporarily hold the clamp frame 802 in the closed configuration so that the user may perform a separate activity without losing or displacing the longitudinal elements. As an example, the user may initially position the longitudinal elements of the working passage 840 and then move the first clamp section 806 to the closed configuration. While the locking pin 815 is in the neutral position, a third party, such as an inspector, can review the positioning of the longitudinal elements throughout a work-site and determine whether the longitudinal elements are appropriately positioned. The user may then return to the clamping device 800, make any requested changes, and then secure the longitudinal elements with the clamping device 800 by activating the secondary locking mechanism.

While the locking pin 815 is in the neutral position, the locking pin 815 may be blocked from being withdrawn along the pin axis 899. For example, the end surface 882 (FIG. 24) of the coupling end 818 may block the distal lobe 830 from moving along the pin axis 899 while in the neutral position. In some embodiments, the end surface 882 blocks the distal lobe 830 at any rotational position within the normal operating range (e.g., a range between the locked position and the unlocking position). As such, any force to withdraw the locking pin 815 will be blocked by the end surface 882.

Figure 26:
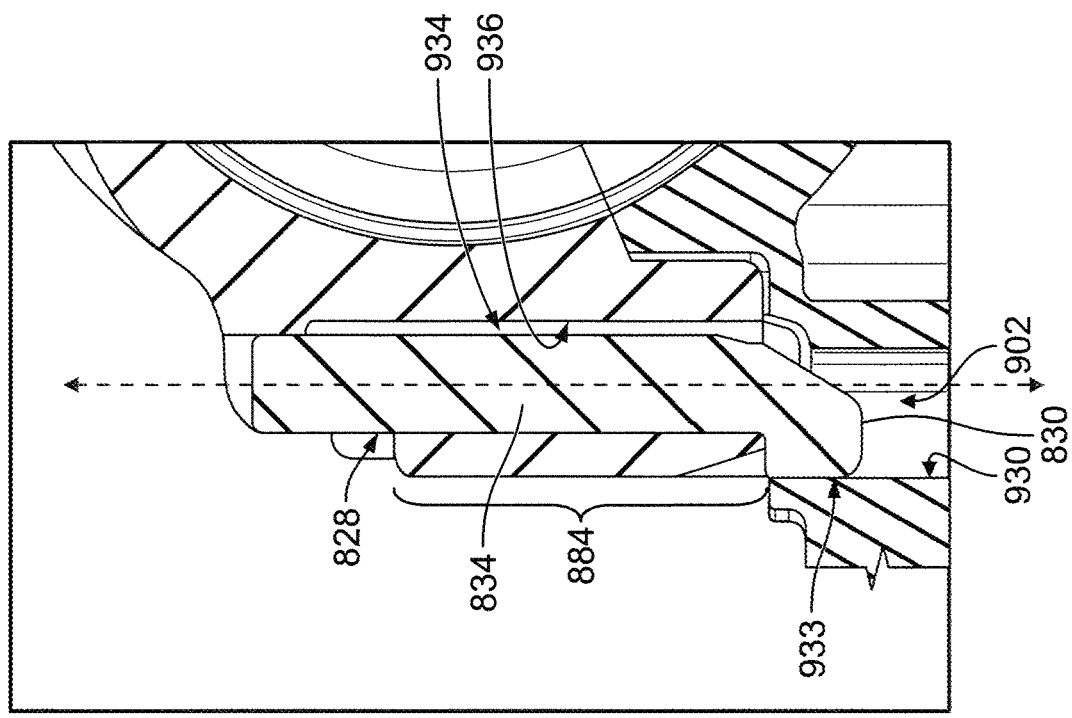
FIG. 26 is a cross-sectional view of a portion of the clamping device of FIG. 17 showing the locking pin in a locked position.

FIG. 26 is a cross-sectional view of the clamp frame 802 and the locking pin 815 when the locking pin 815 is in the locked position. The locking pin 815 is configured to be rotated about the pin axis 899 from the neutral position to the locked position. The distal lobe 830 is configured to engage the base surface 930 as the locking pin 815 is rotated about the pin axis 899. To rotate the locking pin 815 from the neutral position (shown in FIGS. 24 and 25) to the locked position (shown in FIGS. 26 and 27), the user may rotate the locking pin 815 in a first direction. With respect to the views in FIGS. 25 and 27, the first direction is clockwise. The base surface 930 is shaped relative to the dimensions of the distal lobe 830 so that the locking pin 815 may function as described herein. For example, as the distal lobe 830 rotates about the pin axis 899, the toe area 844 (FIGS. 25 and 27) is permitted to rotate to the position shown in FIGS. 26 and 27. The toe area 844 may frictionally engage the base surface 930 as the distal lobe 830 is rotated from the neutral position to the locked position. Nonetheless, the base surface 930 does not prevent (e.g., block) the distal lobe 830 from rotating from the neutral position to the locked position.

As the locking pin 815 is rotated about the pin axis 899, the distal lobe 830 may slidably engage a force-control area 931 the base surface 930. The force-control area 931 and the toe area 844 may generate friction at the interface that requires a greater force to rotate the locking pin 815. Optionally, the force-control area 931 may cause the locking pin 815 to shift such that the pin axis 899 is shifted a nominal amount.

The base surface 930 also includes a retaining area 933. The retaining area 933 may be designed relative to the force-control area 931 to generate less friction with the toe area 844. When the toe area 844 clears the force-control area 931 as the distal lobe 830 is rotated, the distal lobe 830 may "snap" into a designated position associated with the locked position of the locking pin 815. More specifically, a user that is manually rotating the locking pin 815 may recognize a reduction in resistance to rotation. The reduction in resistance is caused by the decrease in friction between the toe area 844 and the base surface 930.

Figure 27:
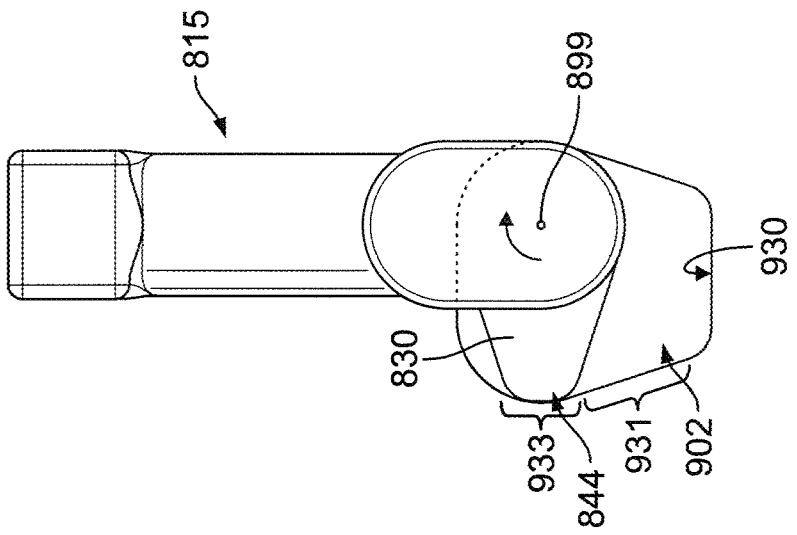
FIG. 27 shows the locking pin and the base cavity, wherein the locking pin is in the locked position.

As shown in FIG. 27, the retaining area 933 is shaped to cradle the toe area 844 of the distal lobe 830. Optionally, the base surface 930 may be configured to cradle other portions of the locking pin 815. Although the base surface 930 may cradle one or more portions of the locking pin 815, the base surface 930 does not prevent rotation of the locking pin 815 between the locked position and the neutral position or between the neutral position and an unlocking position (shown in FIGS. 28 and 29). In the illustrated embodiment, the pin axis 899 may move, at most, a nominal amount when the locking pin 815 is rotated from the neutral position to the locked position. In other embodiments, however, the pin axis 899 may move a greater amount when the locking pin 815 is rotated from the neutral position to the locked position.

As described herein, the handle 826 (FIG. 18) is received within the gripping channel 912 (FIG. 22) when the locking pin 815 is in the locked position. The exterior surface 910 (FIG. 22) forms an interference fit with the handle 826 when the locking pin is in the locked position.

In the locked position, the distal lobe 830 engages the retaining area 933 of the base surface 930, which blocks the distal lobe 830 from exiting the base cavity 902. Because the distal lobe 830 may not exit the base cavity 902, the first clamp section 806 is also blocked from rotating to the open configuration. Optionally, the distal lobe 830 may press against the retaining area 933. For example, the distal lobe 830 may be partially deflected and the shaft 834 may yield and be slightly bent.

As shown in FIG. 26, the passage 884 has an insertion gap 934. The insertion gap 934 exists between an outer surface of the shaft 834 of the pin segment 828 and a base surface 936 that defines the passage 884. The insertion gap 934 extends a length of the passage 834. The insertion gap 934 is sized and shaped to permit the distal lobe 830 to be inserted into the passage 884.

Figure 29:
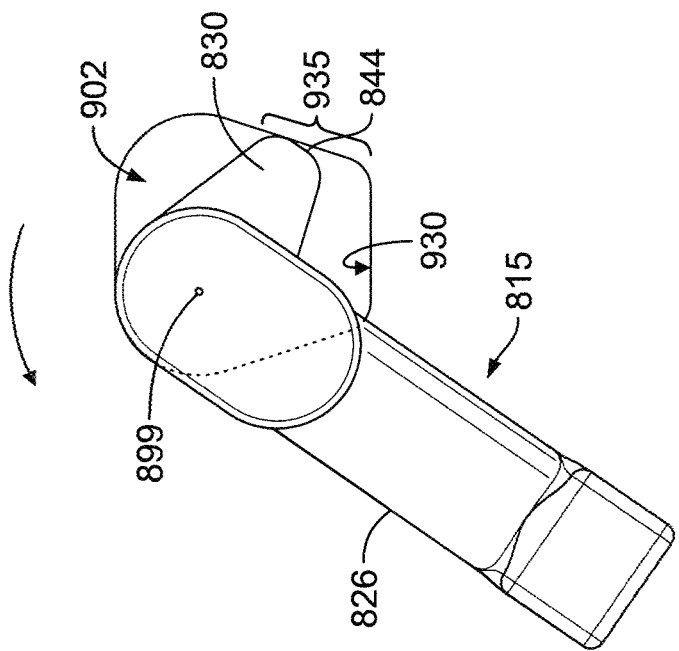
FIG. 29 shows the locking pin and the base cavity, wherein the locking pin is in the unlocking position.
Figure 28:
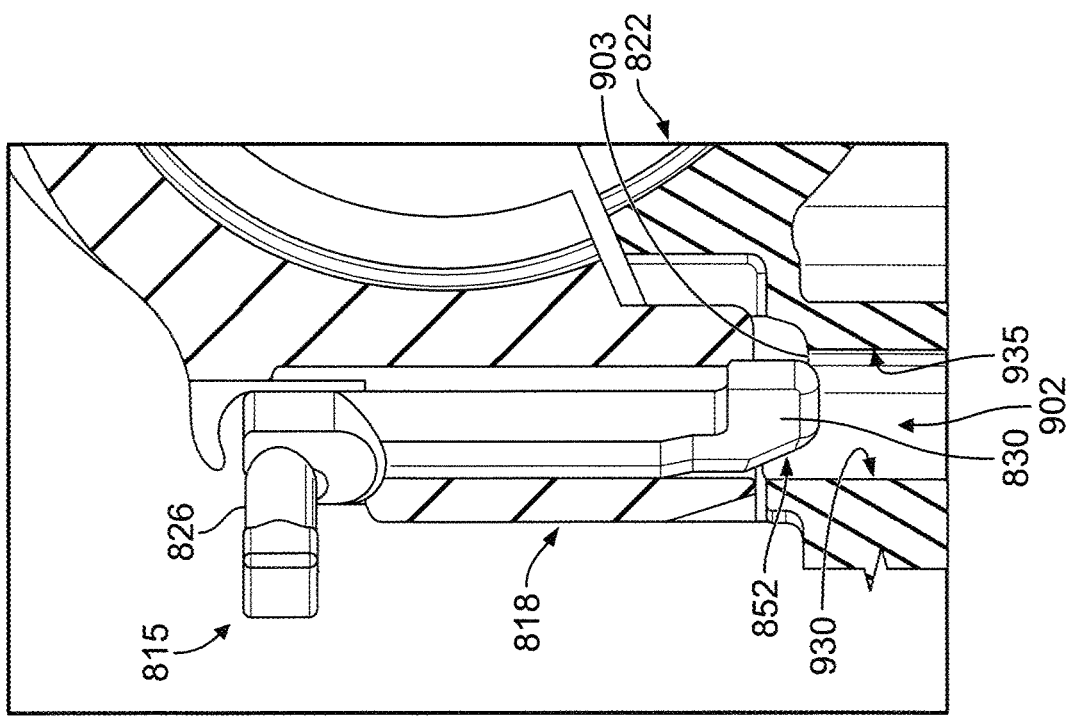
FIG. 28 is a cross-sectional view of a portion of the clamping device of FIG. 17 showing the locking pin in an unlocking position.

FIGS. 28 and 29 show the locking pin 815 in an unlocking position. In the unlocking position, the handle 826 may engage or be proximate to the wall 920 (FIG. 22). To dislodge the coupling end 818 and the coupling base 822, the locking pin 815 may be rotated about the pin axis 899 from the locked position (or from the neutral position) to the unlocking position. This rotation is counter-clockwise using the view in FIG. 29. As the distal lobe 830 is rotated, the toe area 844 engages a push-off area 935 of the base surface 930. When the distal lobe 830 engages the push-off area 935, the locking pin 815 applies a torque force against the push-off area 935. When the torque force exceeds frictional forces of the first locking mechanism holding holds the clamp frame 802 in the closed configuration, the grip elements 888 are dislodged from the mating elements 890. As such, the coupling end 818 is freed from the coupling base 822 and the first clamp section 806 may be rotated away from the coupling base 822.

As the torque force is applied to the base surface 930, the distal lobe 830 may shift in a direction that is away from the working passage 840. More specifically, the locking pin 815 is permitted to shift away from the working passage 840. The distal lobe 830 drives the coupling end 818 away from the coupling base 822, thereby dislodging the clamp frame 802 from the close configuration.

The distal lobe 830 is sized and shaped so that when the locking pin 815 is in the unlocking position, as shown in FIGS. 28 and 29, the distal lobe 830 may exit the base cavity 902. For example, the heel 852 (FIG. 28) is shaped so that the distal lobe 830 may clear the opening 903 of the base cavity 902. Accordingly, one rotational stroke that moves the locking pin 815 to the unlocking position may dislodge the coupling end 818 from the coupling base 822 and permit the user to rotate the coupling end 818 from the coupling base 822.

Accordingly, the locking pin 815 and the clamp frame 802 form a secondary locking mechanism that is activatable after the coupling end 818 and the coupling base 822 are secured to each other in the closed configuration. As the locking pin 815 is rotated to a locked position, the distal lobe 830 engages the slide-control and retaining areas 931, 933 of the base surface 930. Optionally, the retaining area 933 may press against the toe area 844 of the distal lobe 830, thereby pressing the coupling end 818 toward the coupling base 822. In other embodiments, the secondary locking mechanism does not provide an additional force for holding the clamp frame 802 in the closed configuration. Instead, the secondary locking mechanism may prevent the first clamp section 806 from being rotated away from the second clamp section 808.

The distal lobe 830 is also configured to engage the coupling base 822 as the locking pin 815 is rotated to an unlocking position and drive the coupling end 818 away from the coupling base 822, thereby dislodging the coupling end 818 from the coupling base 822. The distal lobe 830 is permitted to exit the base cavity 902 when the locking pin 815 is in the unlocking position. Optionally, the clamp frame 802 includes a mechanism for holding the locking pin 815 in the neutral position. As described above, the clamp frame 802 includes a detent 916 (FIG. 22) that holds the handle 826 when the locking pin 815 is in the neutral position.

Figure 32:
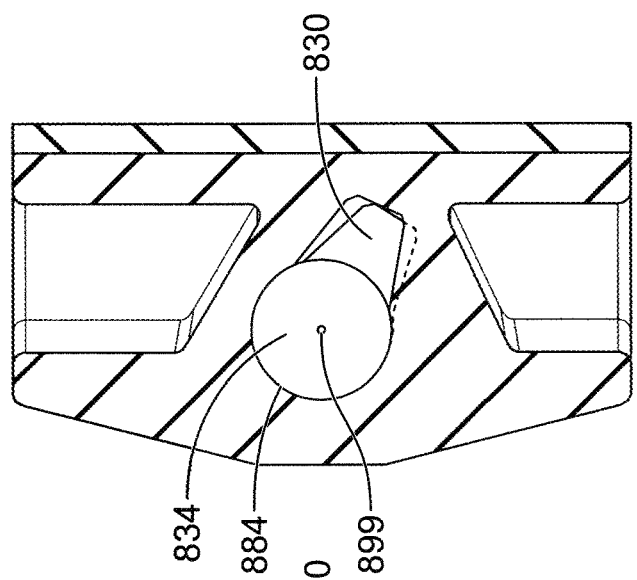
FIG. 32 is a cross-sectional view of the clamp frame after the locking pin has been fully inserted through the passage of the clamp frame.
Figure 31:
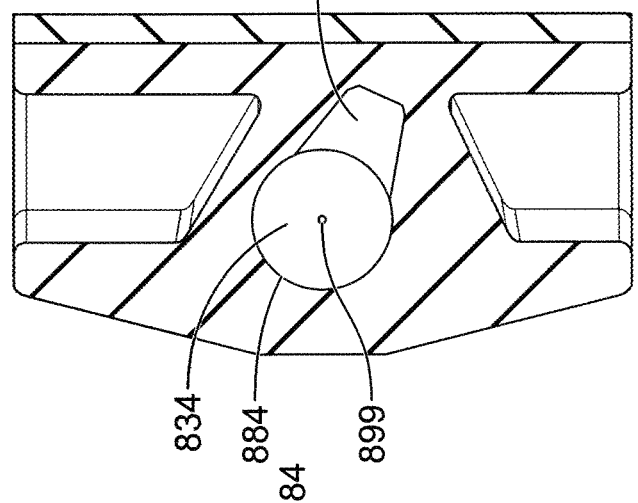
FIG. 31 is a cross-sectional view of the clamp frame as the locking pin is being inserted into a passage of a clamp frame.
Figure 30:
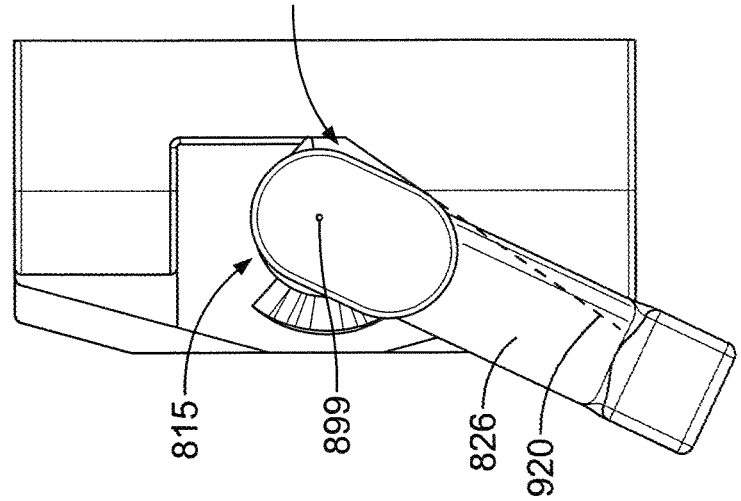
FIG. 30 is a top-down view of the locking pin as the locking pin is being inserted into a passage of a clamp frame.

FIGS. 30-32 illustrate a holding feature that may be incorporated into some embodiments. More specifically, the clamp frame 802 (FIG. 17) and the locking pin 815 may be configured to prevent the locking pin 815 from being inadvertently removed from the passage 884. For example, FIG. 30 shows the locking pin 815 as the locking pin 815 is being inserted and advanced through the passage 884. FIG. 31 is a cross-sectional view of the clamp frame 802 as the locking pin 815 is being advanced through the passage 884. FIG. 32 is a cross-sectional view of the coupling end 818 after the locking pin 815 has been fully inserted through the passage 884. In FIG. 32, the distal lobe 830 is in the unlocking position and the handle 826 is against the wall 920 (FIG. 18). As such, the locking pin 815 is not capable of rotating to a position in which the distal lobe 830 may be pulled through the passage 884.

The distal lobe 830 has a fixed position relative to the handle 826. However, the distal lobe 830 has a rotational orientation in FIG. 32 that is more clockwise than the rotational orientation of the distal lobe 830 in FIG. 31. The phantom line in FIG. 32 represents a portion of the distal lobe 830 that is positioned beneath the end surface 882 (FIG. 20) when the clamping device 800 (FIG. 17) is fully assembled.

To insert the locking pin 815 through the passage 884, the handle 826 must clear the wall 920. Referring to FIG. 30, the dashed line represents the wall 920 beneath the handle 826 as the locking pin 815 is being inserted through the passage 884. In order to position the handle 826 for clearing the wall 920, the locking pin 815 is torqued (or twisted). This torqueing or twisting of the locking pin 815 occurs before the distal lobe 830 clears the end surface 882 (FIG. 20). When the distal lobe 830 clears the end surface 882 (FIG. 20), the potential energy within the torqued locking pin 815 causes the distal lobe 830 to resile toward (e.g., snap back into) the position shown in FIG. 32. Accordingly, the locking pin 815 cannot be withdrawn from the passage 884 without twisting the distal lobe 830 so that the distal lobe 830 may enter the passage 884.

Figure 33:
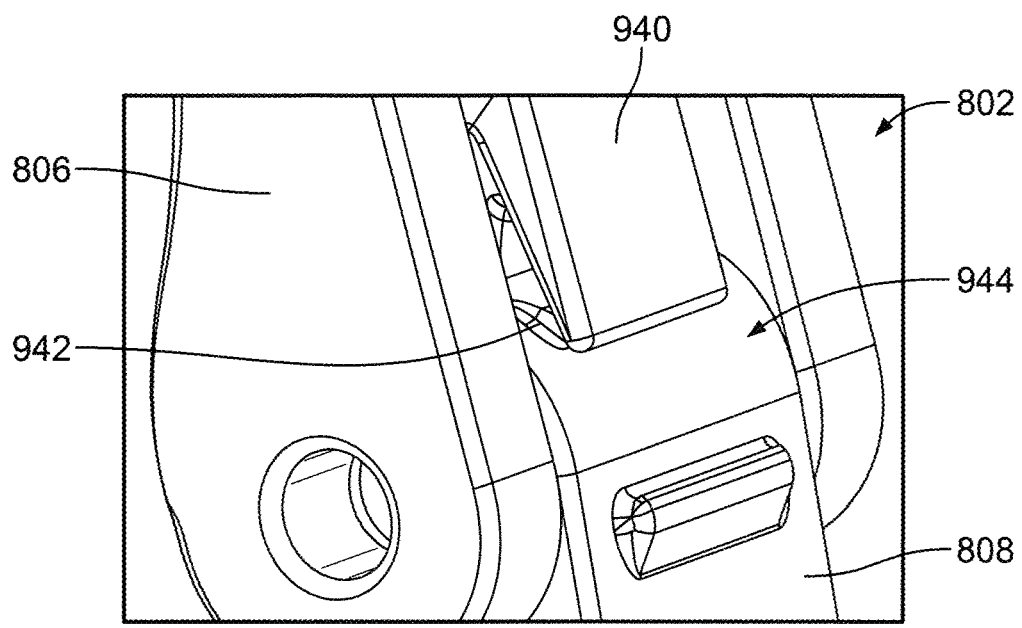
FIG. 33 is an enlarged view of the clamp frame and illustrates a feature that prevents the clamp frame from closing.

FIG. 33 is a perspective view of a portion of the clamp frame 802 while the clamp frame 802 is held in an open configuration. In some embodiments, one of the clamp sections may include a compliant member and the other clamp section may include a retaining feature that extends radially away from an exterior surface of the other claim section. For example, as shown in FIG. 33, the clamp section 806 includes a compliant member 940. The clamp section 808 includes a retaining feature 942. The retaining feature 942 extends radially away from an exterior surface 944 of the clamp section 808. The compliant member 940 may be partially deflected by the retaining feature 942 as the first and second clamp sections 806, 808 move from the closed configuration to an open configuration. The retaining feature 942 is shaped to permit the compliant member 940 to slide over the retaining feature 942.

While in a deflected condition, the compliant member 940 generates a force that presses against the retaining feature 942 and impedes rotation of the first clamp section 806 toward the closed configuration. Frictional forces generated between the compliant member 940 and the exterior surface 944 are sufficient for holding the first clamp section 806 in a stationary position relative to the second clamp section 808. The frictional forces may be sufficient for holding the first clamp section 806 against the force of gravity and any elastic forces generated by a bridge portion of the inner layer that is stretched across the pinching gap (not shown), similar to the bridge portion 164 being stretched across the pinching gap 132 in FIGS. 1 and 2. More specifically, the retaining feature 942 may prevent the first clamp section 806 from rotating back toward the closed configuration and, optionally, prevent the first clamp section 806 from rotating further away from the closed configuration. The retaining feature 942 and the compliant member 940 may facilitate installation of longitudinal elements (e.g., wires, cables, and the like) by remaining in an open configuration to allow the user to, for example, use both hands for positioning the longitudinal elements and/or walk away from the clamp frame.

As one particular example, a user at a work site could install multiple clamp frames along a designated path for a bundle of cables and position the bundle within each of the clamp frames while each of the clamp frames is held in an open position. The user or another person could then inspect the work site to determine whether any changes should be made prior to closing each clamp frame. Similarly, the user could allow other work to be completed at the work site before closing each clamp frame.

Figure 34:
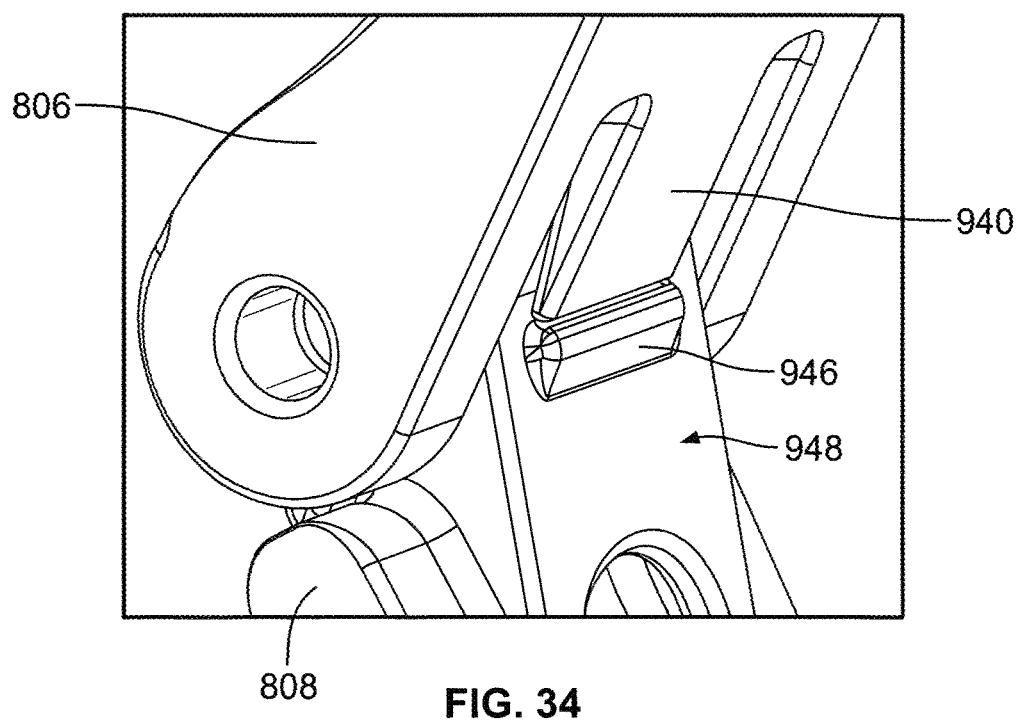
FIG. 34 is an enlarged view of the clamp frame and illustrates a feature that prevents the clamp frame from over-rotating.

FIG. 34 is a perspective view of a portion of the clamp frame 802 when the clamp frame 802 is in a fully extended or opened position. As shown, the compliant member 940 is engaged with a blocking feature 946. The blocking feature 946 projects radially away from an exterior surface 948 of the second clamp section 808. The blocking feature 946 is engaged with the compliant member 940. The blocking feature 946 prevents the clamp section 806 from rotating further away from the closed configuration and overstretching the elastic inner layer.

During installation of the longitudinal element(s), at least one of the first clamp section 806 or the second clamp section 808 may receive the longitudinal element(s). The first clamp section 806 or the second clamp section 808 may function as a temporary support that holds the longitudinal element(s) prior to the clamping device 800 being fully closed. For example, when the first and second clamp sections 806, 808 are in the open configuration, the clamping device 800 may permit positioning one or more of the longitudinal elements within the spaces defined by the first clamp section 806 or the second clamp section 808. After the longitudinal element(s) are positioned, the clamping device 800 allows the user to release the already positioned longitudinal element(s) (and the clamping device 800) and retrieve additional longitudinal elements. While the user retrieves other longitudinal elements, the first clamp section 806 and/or the second clamp section 808 may hold the longitudinal element(s) that have already been positioned. Such embodiments may be suitable for applications in which the clamping device 800 is difficult to reach. For example, a user may be able to use a single hand for positioning the longitudinal elements, which may require multiple steps, and closing the clamping device 800. In some cases, the clamping device 800 may be only partially closed while the user is retrieving the other longitudinal elements.

Figure 35:
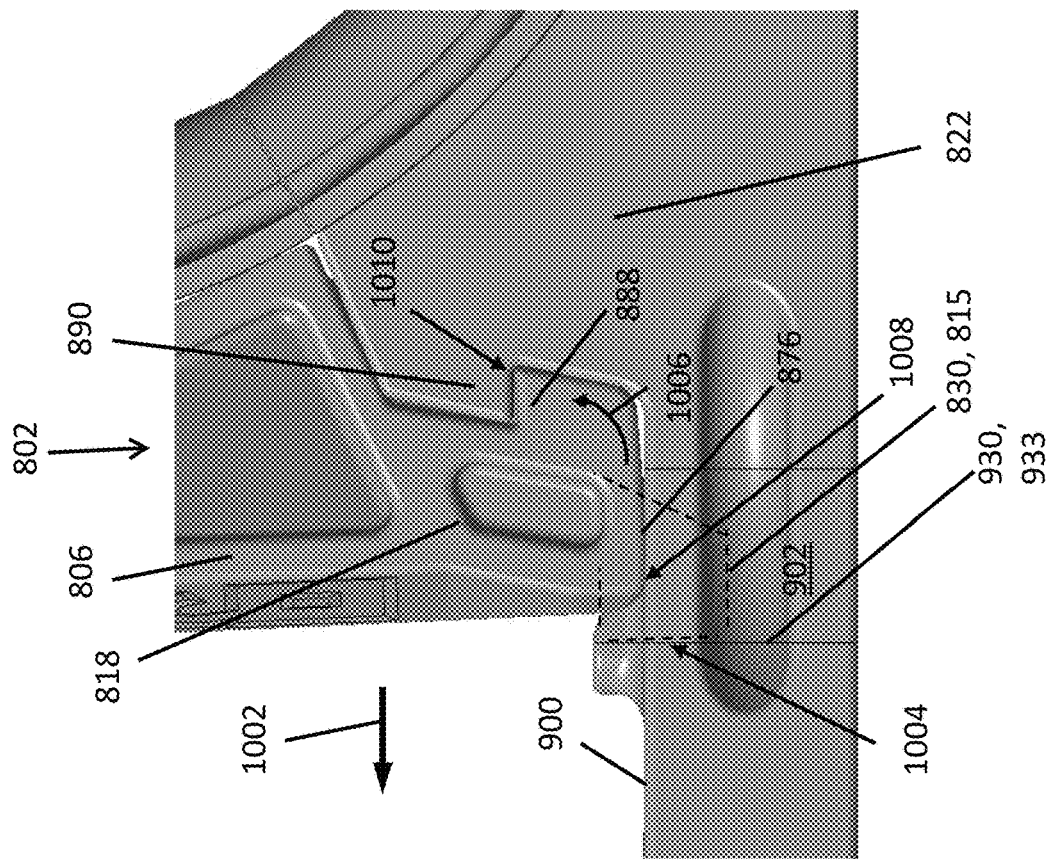
FIG. 35 is a side view of the clamping device in a closed configuration illustrating a force attempting to separate the coupling end and the coupling base of the clamping device of FIG. 17.

FIG. 35 is a side view of the clamping device 800 in a closed configuration illustrating a force 1002 attempting to separate the coupling end 818 and the coupling base 822. As shown, the mating element 890 of the coupling base 822, and the grip element 888 of the coupling end 818 are engaged. The distal lobe 830 is in the locked position and engaged to the base surface 930 of the base cavity 902 at the retaining area 933. A first interface (or pin-base interface) 1004 exists where the distal lobe 902 and the base surface 930 engage each other. The force 1002 is directed to separate the coupling end 818 and the coupling base 822. In the illustrated embodiment, the force 1002 coincides with the plane P (FIG. 17) and is in a lateral direction that is transverse to the exterior surface of the coupling end 818.

For at least some embodiments, the coupling end 818 and the coupling base 822 are configured to transfer a load from the locking pin 815 to the clamp frame 802 when the force 1002 is applied to the first clamp section 806. As indicated by the arrow 1006, the coupling end 818 may partially tilt or rotate relative to the coupling base 822. In some circumstances, the coupling end 818 may partially shift along the plane P when the force is applied. As such, movement by the coupling end 818 may include an angular or rotational component and/or a linear component when the force 1002 is applied. In the illustrated embodiment, the movement includes an angular component.

As the force 1002 pulls the coupling end 818, the base surface 930 blocks the distal lobe 830 from moving in the direction of the force 1002. Tolerances of the clamp frame 802 and/or material properties of the clamp frame 802 may permit the clamp frame 802 to move and allow the coupling end 818 to partially rotate with respect to the first interface 1004. The coupling end 818 may also partially rotate with respect to a second interface (or end-base interface or end-stage interface) 1008 between the tab 876 of the coupling end 818 and the stage 900 of the coupling base 822. The grip element 888 and the mating element 890 are designed to engage each other at a third interface (or end-base interface or element-element interface) 1010 as the coupling end 818 moves. Of the first, second, and third interfaces, the third interface 1010 is closer to a point at which the force 1002 (or moment) is exerted on the clamp frame 802. The second interface 1008 is the next closest followed by the first interface 1004.

Accordingly, when the force 1002 is applied, the coupling end 818 partially rotates relative to the coupling base 822 thereby driving the grip element 888 in a non-linear direction into the mating element 890 at the third interface 1010. The non-linear direction includes a vertical component that is transverse to the direction 1002. As the grip element 888 presses into the mating element 890, the load applied by the coupling end 818 at the first interface 1004 is at least partially transferred to or sustained by the second and third interfaces 1008, 1010. As such, a shear force sustained by the locking pin 815 is limited by the second and third interfaces 1008, 1010. Moreover, as the load is at least partially transferred to or sustained by the second and third interfaces 1008, 1010, a grip force that holds the coupling end 818 and the coupling base 822 with respect to each other increases.

Figure 36:
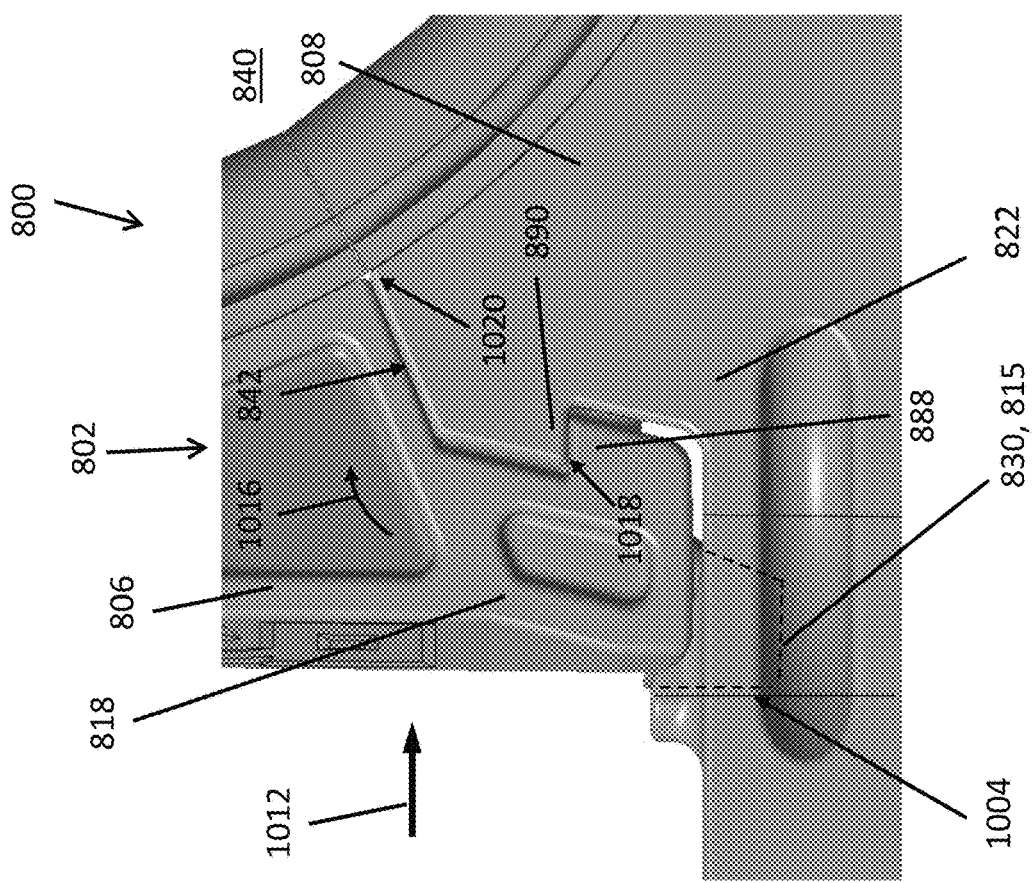
FIG. 36 is a side view of the clamping device in a closed configuration illustrating a different force exerted on the clamping device of FIG. 17.

FIG. 36 is a side view of the clamping device 800 in a closed configuration illustrating a force 1012 exerted on the clamp frame 802. For at least some embodiments, the coupling end 818 and the coupling base 822 are configured to transfer a load from the locking pin 815 to the clamp frame 802 when the force 1012, which is opposite the force 1002 (FIG. 34), is applied to the clamp frame 802. As the force 1012 pushes or compresses the first clamp section 806, the coupling end 818 may move in a non-linear manner (as indicated by the arrow 1016), which may include an angular component and an XY component along the plane P.

The coupling end 818 may also partially rotate with respect to an interface (or end-base interface or element-element interface) 1018 between the grip element 888 and the mating element 890, which may be proximate to or overlap with the third interface 1010 (FIG. 35). The first and second clamp sections 806, 808 also engage each other at an interface (or seam interface) 1020, which is along a seam 842 between the first and second clamp section 806, 808 and proximate to the working passage 840. In a similar manner, the load generated by the force 1012 may be partially transferred from the first interface 1004 to the interfaces 1018, 1020. As such, a shear force sustained by the locking pin 815 is limited by the interfaces 1018, 1020. Moreover, as the load is at least partially transferred to or sustained by the interfaces 1018, 1020, a grip force that holds the coupling end 818 and the coupling base 822 with respect to each other may increase.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. A clamping device comprising:
a clamp frame that is configured to move between an open configuration, in which the clamp frame is configured to receive at least one longitudinal element, and a closed configuration, in which the clamp frame wraps around and holds the at least one longitudinal element, the clamp frame including a coupling end having an inner surface and a coupling base having an outer surface, the inner and outer surfaces having profiles that form a locked engagement to hold the clamp frame in the closed configuration; and
a secondary locking mechanism that secures the coupling end and the coupling base to each other, the secondary locking mechanism being activatable after the clamp frame is held in the closed configuration by the locked engagement; and
wherein the clamp frame has a passage through the coupling end and the coupling base has a base cavity that aligns with the passage when the clamp frame is in the closed configuration, the secondary locking mechanism including a locking pin having a handle and a pin segment extending through the passage and into the base cavity, the pin segment being rotatable about a pin axis and having a distal lobe that projects radially away from the pin axis, the base cavity being defined by a base surface of the coupling base, wherein the distal lobe is operable to engage the base surface and, as the pin segment is rotated about the pin axis to an unlocking position, dislodges the coupling end from the coupling base.

2. The clamping device of claim 1, wherein, as the locking pin is rotated about the pin axis to a locked position, the distal lobe engages a base surface of the base cavity that urges the coupling end toward the coupling base.

3. The clamping device of claim 2, wherein the clamp frame includes an exterior surface that defines a gripping channel, the handle configured to be received within the gripping channel when the locking pin is in the locked position, the handle forming an interference fit with the exterior surface that defines the gripping channel.

4. The clamping device of claim 2, wherein the base surface blocks the distal lobe from exiting the base cavity when the locking pin is in the locked position, the locking pin operable to be rotated to a neutral position between the locked position and the unlocking position, the base surface permitting the distal lobe to exit the base cavity when the locking pin is in the neutral position.

5. The clamping device of claim 4, wherein the locking pin is operable to move (a) from the unlocking position to the locked position in one turn and (b) from the unlocking position to the neutral position and then back to the unlocking position without moving to the locked position.

6. The clamping device of claim 1, wherein the clamp frame includes an exterior surface that defines a detent and wherein the locking pin is operable to be rotated to a neutral position, the detent holding the handle in the neutral position.

7. The clamping device of claim 6, wherein the coupling end blocks the distal lobe from moving through the passage when the handle is in the neutral position.

8. The clamping device of claim 1, wherein the clamp frame and the locking pin are sized and shaped such that the locking pin is torqued as the locking pin is inserted through the passage.

9. The clamping device of claim 1, wherein the clamp frame includes two discrete clamp sections that each have a respective joint end, the joint ends being movably coupled to each other, and wherein one of the clamp sections includes a compliant member and the other clamp section includes a retaining feature that extends radially away from an exterior surface of the other clamp section, the compliant member being deflected by the retaining feature as the clamp sections move from the closed configuration to the open configuration, the compliant member, when deflected and engaged by the retaining feature, generating a force that holds the clamp sections in the open configuration.

10. The clamping device of claim 1, wherein the clamp frame includes two discrete clamp sections that each have a respective joint end, the joint ends being movably coupled to each other, and wherein one of the clamp sections includes a blocking feature that extends radially away from an exterior surface of the clamp section, the blocking feature engaging the other clamp section as the clamp sections move from the closed configuration to the open configuration, the blocking feature preventing the other clamp section from further rotation.

11. A clamping device comprising:
a clamp frame that is operable to move between an open configuration, in which the clamp frame is configured to receive at least one longitudinal element, and a closed configuration, in which the clamp frame wraps around and holds the at least one longitudinal element, the clamp frame including a coupling end having an inner surface and a coupling base having an outer surface, the inner and outer surfaces having profiles that form a locked engagement to hold the clamp frame in the closed configuration; and
a secondary locking mechanism that secures the coupling end and the coupling base to each other, the secondary locking mechanism being activatable after the clamp frame is held in the closed configuration by the locked engagement;
wherein the clamp frame has a passage through the coupling end and the coupling base has a base cavity that aligns with the passage when the clamp frame is in the closed configuration, the secondary locking mechanism including a locking pin having a handle and a pin segment extending through the passage and into the base cavity, the pin segment being rotatable about a pin axis and having a distal lobe that projects radially away from the pin axis, wherein:
the distal lobe is configured to engage the coupling base as the locking pin is rotated to a locked position, thereby holding the coupling end toward the coupling base;
the distal lobe is configured to engage the coupling base, as the locking pin is rotated to an unlocking position, and drive the coupling end away from the coupling base, thereby dislodging the coupling end from the coupling base; and
the distal lobe is permitted to exit the base cavity when the locking pin is in a neutral position, the clamp frame including an exterior surface that is shaped to hold the handle when the locking pin is in the neutral position.

12. The clamping device of claim 11, wherein the clamp frame includes an exterior surface that defines a gripping channel, the handle configured to be received within the gripping channel when the locking pin is in the locked position, the handle forming an interference fit with the exterior surface that defines the gripping channel.

13. The clamping device of claim 11, wherein the coupling end blocks the distal lobe from moving through the passage when the handle is in the neutral position.

14. The clamping device of claim 11, wherein the clamp frame and the locking pin are sized and shaped such that the locking pin is torqued as the locking pin is inserted through the passage.

15. The clamping device of claim 11, wherein the clamp frame includes two discrete clamp sections that each have a respective joint end, the joint ends being movably coupled to each other, wherein one of the clamp sections includes a compliant member and the other clamp section includes a retaining feature that extends radially away from an exterior surface of the other clamp section, the compliant member being deflected by the retaining feature as the clamp sections move from the closed configuration to the open configuration, the compliant member, when deflected and engaged by the retaining feature, generating a force that holds the clamp sections in the open configuration.

16. The clamping device of claim 15, wherein the coupling end blocks the distal lobe from moving through the passage when the handle is in the neutral position and the clamp sections are held in the open configuration.

17. The clamping device of claim 15, wherein one of the clamp sections includes a blocking feature that extends radially away from an exterior surface of the clamp section, the blocking feature engaging the other clamp section as the clamp sections move from the closed configuration to the open configuration, the blocking feature preventing the other clamp section from further rotation.

18. A clamping device comprising:
a clamp frame that is operable to move between an open configuration and a closed configuration, wherein the clamp frame wraps around and holds at least one longitudinal element in the closed configuration within a working passage defined by the clamp frame, the clamp frame including a coupling end and a coupling base that engage each other in the closed configuration;
a locking pin having a pin segment that couples to the coupling end and engages the coupling base at a threadless pin-base interface when in the closed configuration; and
wherein the coupling end has a grip element and the coupling base has a mating element, the grip element and the mating element configured to engage each other at an end-base interface while the clamp frame is in the closed configuration, the coupling end and the coupling base being configured to transfer a load from the locking pin to the clamp frame when a lateral force is applied to the coupling end and drives the grip element into the mating element at the end-base interface in a direction that is at least partially transverse to a direction of the lateral force, the locking pin being movable with respect to the coupling end and the coupling base while the clamp frame is in the closed configuration.

19. The clamping device of claim 18, wherein the end-base interface is located closer to the passage than the pin-base interface.

20. The clamping device of claim 18, wherein the lateral force is a first lateral force and the load is a first load, the coupling end and the coupling base being configured to transfer a second load from the locking pin to the clamp frame when a second lateral force is applied to the coupling end, the second lateral force being opposite the first lateral force, wherein the first load is at least partially transferred from the pin-base interface to the end-base interface, wherein the second load is at least partially transferred from the pin-base interface to a different end-base interface between the coupling end and the coupling base.

* * * * *